US012548409B2

(12) United States Patent
Moody

(10) Patent No.: US 12,548,409 B2
(45) **Date of Patent: *Feb. 10, 2026**

(54) GAMING SYSTEM AND METHOD PROVIDING A WAGERING GAME WITH AN AWARD MODIFIER BONUS FEATURE

(71) Applicant: IGT, Las Vegas, NV (US)

(72) Inventor: Ernest W. Moody, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/470,918

(22) Filed: Sep. 20, 2023

(65) Prior Publication Data

US 2024/0013628 A1 Jan. 11, 2024

Related U.S. Application Data

(63) Continuation of application No. 18/469,926, filed on Sep. 19, 2023, which is a continuation of application No. 18/468,886, filed on Sep. 18, 2023, which is a continuation of application No. 18/467,004, filed on Sep. 14, 2023, which is a continuation of application No. 17/178,628, filed on Feb. 18, 2021, now Pat. No. 11,798,369, which is a continuation of application No. 15/704,631, filed on Sep. 14, 2017, now Pat. No. 10,930,117.

(60) Provisional application No. 62/399,513, filed on Sep. 26, 2016.

(51) Int. Cl.
*G07F 17/32* (2006.01)

(52) U.S. Cl.
CPC ...... *G07F 17/3267* (2013.01); *G07F 17/3211* (2013.01); *G07F 17/3241* (2013.01); *G07F 17/3244* (2013.01); *G07F 17/3293* (2013.01)

(58) Field of Classification Search
CPC ............. G07F 17/3267; G07F 17/3211; G07F 17/3241; G07F 17/3244; G07F 17/3293
See application file for complete search history.

(56) References Cited

U.S. PATENT DOCUMENTS

| | | | | |
|---|---|---|---|---|
| 5,086,429 | A * | 2/1992 | Gray | G06F 11/2038 714/13 |
| 5,816,915 | A * | 10/1998 | Kadlic | G07F 17/32 463/13 |
| 6,007,066 | A | 12/1999 | Moody | |
| 6,328,649 | B1 | 12/2001 | Randall et al. | |
| 6,454,651 | B1 | 9/2002 | Yoseloff | |
| 6,645,078 | B1 | 11/2003 | Mattice | |
| 6,709,333 | B1 | 3/2004 | Bradford et al. | |
| 7,037,190 | B2 | 5/2006 | Moody et al. | |
| 7,247,092 | B2 | 7/2007 | Jarvis et al. | |

(Continued)

OTHER PUBLICATIONS

IGT, "Ultimate X Poker Tournament Manager", Available prior to Sep. 14, 2017 (2 pages).

(Continued)

*Primary Examiner* — Jeffrey K Wong
(74) *Attorney, Agent, or Firm* — Neal, Gerber & Eisenberg LLP

(57) ABSTRACT

Various embodiments of the present disclosure are directed to a gaming system and method providing a multi-hand poker wagering game with an award modifier bonus feature, and wherein in various embodiments the award modifiers are multipliers.

20 Claims, 12 Drawing Sheets

(56) References Cited

U.S. PATENT DOCUMENTS 7,819,740 B2 10/2010 Masci et al.
7,867,080 B2 1/2011 Nicely et al.
8,152,616 B2 4/2012 Moody
8,277,305 B2 10/2012 Caputo et al.
8,439,737 B1 5/2013 Moody
8,460,094 B2 6/2013 Bigelow et al.
8,562,419 B2 10/2013 Nicely
8,876,586 B2 11/2014 Berman
8,986,104 B2 3/2015 Nicely
9,138,634 B2 9/2015 Moody
9,142,093 B2 9/2015 Jaffe et al.
9,153,101 B2 10/2015 Cannon et al.
9,262,891 B2 2/2016 Tessmer
9,401,071 B2 7/2016 Moody
9,424,714 B2 8/2016 Moody
9,437,079 B2 9/2016 Nicely
9,489,806 B2 11/2016 Nicely
9,552,693 B1 * 1/2017 Reeves ............... G07F 17/3239
9,640,037 B2 5/2017 Berman et al.
9,754,450 B2 9/2017 Moody
10,930,117 B2 * 2/2021 Moody ............... G07F 17/3293
11,798,369 B2 * 10/2023 Moody ............... G07F 17/3241
2001/0009865 A1 * 7/2001 Demar .................... G07F 17/32 463/20
2002/0052230 A1 5/2002 Martinek et al.
2003/0013522 A1 * 1/2003 Muir ................... G07F 17/3202 463/36
2003/0013531 A1 * 1/2003 Rowe .................. G07F 17/3248 463/42
2003/0050111 A1 * 3/2003 Saffari ................ G07F 17/3255 463/25
2003/0054874 A1 * 3/2003 Kaminkow ............. G07F 17/32 463/20
2003/0119572 A1 6/2003 Moody et al.
2004/0038733 A1 * 2/2004 Walker ................ G07F 17/3244 463/25
2004/0048673 A1 3/2004 Kaminkow
2004/0053672 A1 3/2004 Baerlocher
2004/0082384 A1 4/2004 Walker et al.
2004/0248641 A1 12/2004 Jarvis et al.
2005/0055115 A1 3/2005 Gerrard et al.
2005/0215325 A1 * 9/2005 Nguyen .............. G07F 17/3202 463/16
2006/0025206 A1 * 2/2006 Walker .................... G07F 17/32 463/20
2006/0100019 A1 * 5/2006 Hornik ................ G07F 17/3206 463/42
2008/0026854 A1 1/2008 Chen et al.
2008/0146346 A1 * 6/2008 Hardy ................... G07F 17/329 463/16
2009/0036202 A1 * 2/2009 Baerlocher ......... G07F 17/3244 463/25
2009/0111577 A1 4/2009 Mead
2010/0105454 A1 * 4/2010 Weber ..................... H04L 67/53 463/1
2012/0004033 A1 * 1/2012 Lyons ................. G07F 17/3211 715/702
2013/0072282 A1 3/2013 Nicely
2013/0130778 A1 5/2013 Anderson et al.
2013/0217457 A1 8/2013 Jarvis et al.
2014/0087829 A1 3/2014 Watkins et al.
2014/0162757 A1 * 6/2014 Moody ................... G07F 17/34 463/20
2015/0379823 A1 12/2015 Brown et al.
2017/0092059 A1 * 3/2017 Nelson ................ G07F 17/3225
2017/0124799 A1 * 5/2017 Berman .............. G07F 17/3213
2017/0294079 A1 10/2017 Caputo et al.
2017/0316655 A1 11/2017 Holsclaw et al.
2018/0130285 A1 * 5/2018 Ang .................... G07F 17/3244
2018/0158277 A1 6/2018 Reeves
2020/0242885 A1 * 7/2020 Culp ................... G07F 17/3241
2021/0343119 A1 * 11/2021 Colvin ................ G07F 17/3267
2024/0005745 A1 * 1/2024 Moody ............... G07F 17/3244

OTHER PUBLICATIONS

Tamburin, Henry, "How to Play Ultimate X Video Poker", http://www.casinocenter.com/how-to-play-ultimate-x-video-poker/ (10 pages), available before the priority date of this application.

* cited by examiner

GAMING SYSTEM AND METHOD PROVIDING A WAGERING GAME WITH AN AWARD MODIFIER BONUS FEATURE

PRIORITY CLAIM

This patent application is a continuation of, claims priority to and the benefit of U.S. patent application Ser. No. 18/469,926, filed on Sep. 19, 2023, which application is a continuation of, claims priority to and the benefit of U.S. patent application Ser. No. 18/468,886, filed on Sep. 18, 2023, which application is a continuation of, claims priority to and the benefit of U.S. patent application Ser. No. 18/467,004, filed on Sep. 14, 2023, which application is a continuation of, claims priority to and the benefit of U.S. patent application Ser. No. 17/178,628, filed on Feb. 18, 2021, which application is a continuation of, claims priority to and the benefit of U.S. patent application Ser. No. 15/704,631, filed on Sep. 14, 2017, now U.S. Pat. No. 10,930,117, issued on Feb. 23, 2021, which claims priority to and the benefit of U.S. Provisional Patent Application No. 62/399,513, filed on Sep. 26, 2016, the entire contents of each are incorporated herein by reference.

BACKGROUND

Video poker has become very popular. One of the most common variations of video poker is Five Card Draw Poker. In general, for a play of a Five Card Draw Poker game, a player is dealt a hand of five cards face up from a 52-card deck of playing cards. The player can discard none of, one of, a plurality of but less than all of, or all of the five cards from the player's hand. Each discarded card is replaced with another card from the deck. After replacing any discarded cards, the cards of the player's hand are evaluated against a paytable to determine whether the player's hand forms a winning hand associated with one of a plurality of different winning hand categories.

SUMMARY

Various embodiments of the present disclosure are directed to a gaming system and method providing a wagering game with an award modifier bonus feature. In various embodiments, the award modifier is a multiplier.

In various embodiments, the gaming system includes a processor; and a memory storing instructions that, when executed, cause the processor to at least: cause a display device to display a first play of a wagering game responsive to receipt of a game-initiation input, the wagering game including a plurality of hands; and for a first hand of the plurality of hands of the first play of the wagering game: determine if any multiplier bonus is associated with the first hand; and in response to a determination that the multiplier bonus is associated with the first hand, add the multiplier bonus to a multiplier queue associated with the first hand, the multiplier bonus including (1) a first multiplier associated with a corresponding first hand of a subsequent second play of the wagering game, and (2) a second multiplier associated with a corresponding first hand of a subsequent third play of the wagering game; and cause the display device to display the multiplier queue including the first multiplier and the second multiplier.

In various embodiments, the gaming system includes a processor and a memory device storing instructions that, when executed, cause the processor to at least: initiate a first play of a wagering game responsive to receipt of a game-initiation input; randomly determine a plurality of cards from a first set of cards to form an initial first hand of cards; cause a display device to display the first hand of cards; cause the display device to display an indication of a second hand of cards; cause an input device to, for each card in the first hand of cards, enable input of a hold input for a selected card; in response to detecting a hold input for a card in the first hand: designate the card as a held-card of the first hand of cards; duplicate the card in the second hand of cards; and cause the display device to display the duplicated card in the second hand of cards; designate each card for which the hold input is not received in the first hand of cards as a non-held card; in response to detecting a draw input, for each non-held card in the first hand of cards: randomly determine a replacement card from the first set of cards; replace the non-held card with the replacement card; cause the display device to display the replacement card in the first hand of cards; randomly determine an additional card from a second set of cards associated with the second hand of cards; add the additional card to the second set of cards; and cause the display device to display the additional card in the second hand of cards; determine a first award based on: (1) the first hand of cards, (2) a paytable, and (3) any first multiplier bonus associated with the first hand of cards; determine a second award to be associated with a second play of the wagering game, the second award based on: (1) the first hand of cards, and (2) a multiplier bonus award paytable, the second award including a second multiplier bonus based on the first hand of cards; add the second multiplier bonus to a multiplier queue of a multiplier meter associated with the first hand of cards; and cause the display device to display the second multiplier bonus in the multiplier queue.

DETAILED DESCRIPTION

The Detailed Description uses numbered headings for clarity. These headings do not limit the scope of the present disclosure.

Example Method

Figure 1A:
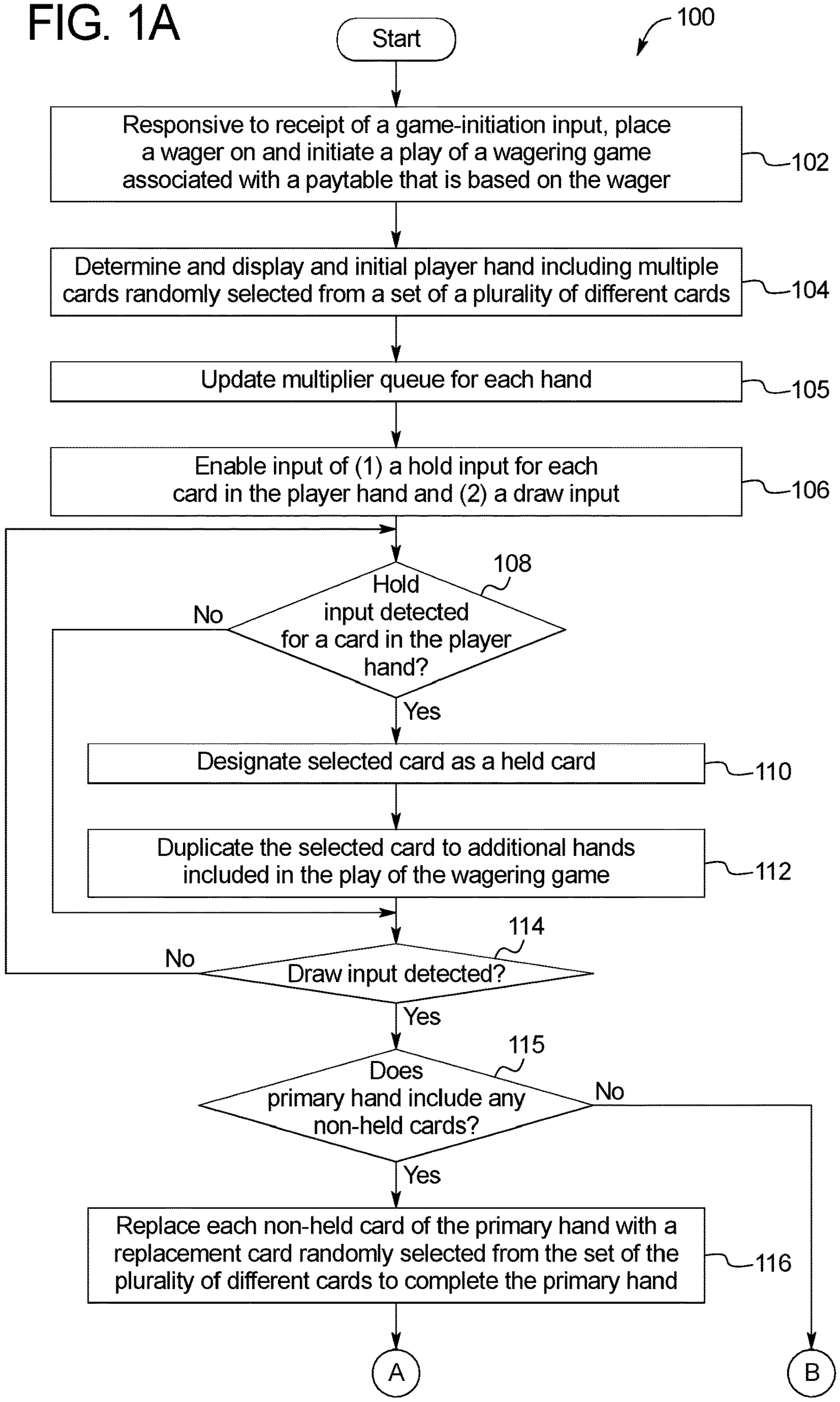
FIGS. 1A and 1B are a flowchart of a process or method of operating one example embodiment of the gaming system of the present disclosure to provide a play of one example embodiment of the wagering game with an award modifier bonus feature of the present disclosure.
Figure 1B:
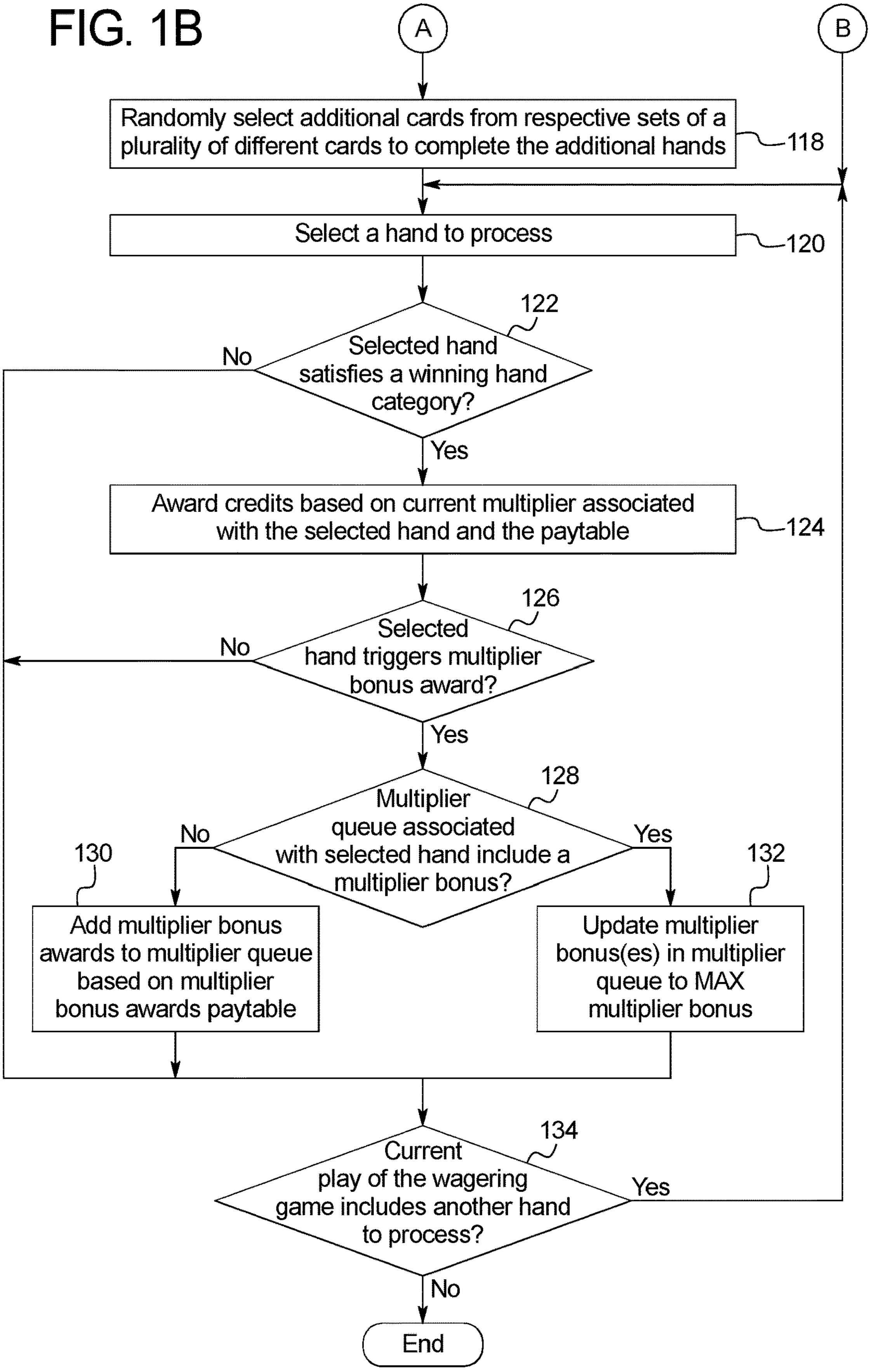

FIGS. 1A and 1B are a flowchart of a process or method 100 of operating one example embodiment of the gaming system of the present disclosure to provide a play of one example embodiment of the wagering game with the award modifier bonus feature of the present disclosure. In this illustrated example, the award modifier is an award multiplier. However, such an example is not meant to limit the present disclosure. In various embodiments, a set of instructions stored in one or more memories and executed by one or more processors represents the process 100. Although the process 100 is described with reference to the flowchart shown in FIGS. 1A and 1B, many other processes of performing the acts associated with this process 100 may be employed. For example, the order of certain of the blocks or diamonds may be changed, certain of the blocks or diamonds may be optional, or certain of the blocks or diamonds may not be employed.

In operation of this example embodiment, the process 100 begins after the gaming system establishes a credit balance for a player (such as after an acceptor of the gaming system receives and validates physical currency or a physical ticket associated with a monetary value). The gaming system receives a game-initiation input (such as an actuation of a physical deal button or a virtual deal button via a touch screen) and, in response, places a wager on and initiates a play of a wagering game associated with a paytable, as block 102 indicates. The paytable is determined based on the type of game being played and the wager (or in other embodiments the wagering game's denomination). Table 1 below includes an example paytable for a 5 credit (maximum) wager per hand Jacks or Better Five Card Draw Poker Game. The paytable includes the different winning hand categories, example winning hands associated with the different winning hand categories, and awards associated with the winning hand categories. The winning hand categories are listed from highest to lowest ranking. Although not shown here, winning hands are also ranked within the different winning hand categories as is known in the art. In this example embodiment, the winning hands of the "Jacks or Better" winning hand category include a pair of Jacks, a pair of Queens, a pair of Kings, and a pair of Aces.

TABLE 1

Winning hand categories, example winning hands, and awards for example Jacks or Better Five Card Draw Poker (5 credit max wager)

| Winning Hand Category | Example Winning Hand | Award (5 credit bet) |
|---|---|---|
| Royal Flush | A♣ K♣ Q♣ J♣ 10♣ | 4000 |
| Straight Flush | 10♣ 9♣ 8♣ 7♣ 6♣ | 250 |
| Four of a Kind | J♣ J♥ J♦♠ 3♣ | 125 |
| Full House | A♥ A♦ A♣ 6♦ 6♣ | 40 |
| Flush | A♣ J♣ 8♣ 6♣ 2♣ | 30 |
| Straight | 8♦ 7♣ 6♠ 5♠ 4♣ | 20 |
| Three of a Kind | Q♠ Q♥ Q♦ 6♦ 2♠ | 15 |
| Two Pair | 8♦ 8♥ 5♥ 5♣ 2♠ | 10 |
| Jacks or Better | K♦ K♠ 8♣ 7♣ 2♥ | 5 |

The gaming system determines and displays a player hand including multiple cards randomly selected from a set of a plurality of different cards, as block 104 indicates. For instance, the set of cards includes the cards of a standard 52-card deck, and the gaming system randomly determines, and without replacement, five of the cards of the standard 52-card deck to include in the player hand. The gaming system also displays place holders for cards that will eventually be added to additional hands included in the play of the wagering game.

The gaming system also updates a modifier queue such as a multiplier queue associated with each hand of the play of the wagering game, as block 105 indicates. The multiplier queue of each hand includes a multiplier (or multipliers), if any, that was or were awarded to the player during one or more previous plays of the wagering game for the respective hand. In this example embodiment, the multipliers are awarded based on a multiplier bonus awards paytable, as described below in connection with diamond 126. The gaming system shifts a multiplier from each of the multiplier queues to be a current multiplier that is applied to any awards issued (or provided) to the player for the respective hand during the current play of the wagering game. It should be appreciated that this updating step can be done before any cards of the hand are displayed or before the start of this play of the game (such as at the end of the last play of the game).

After forming the player hand, the gaming system enables input of: (1) a hold input for each card in the player hand; and (2) a draw input, as block 106 indicates. As diamonds 108 and 114 indicate, the gaming system monitors for receipt of the card hold input (or inputs) or the draw input. This enables the player to choose which of the initial cards of the player hand (if any) to hold and which of the initial cards to discard (if any). Responsive to the gaming system determining at diamond 108 that a card hold input identifying a particular card of the player hand has been received, the gaming system designates that card as a held card, as block 110 indicates. For example, the player may select (via an input device) to hold the first card, the third card, and the fifth card of the initial cards of the player hand. In such a case, the gaming system then designates the first card, the third card, and the fifth card of the player hand as held cards.

The gaming system then duplicates each such held card from the player hand to any additional hands included in this example play of the wagering game, as block 112 indicates. For example, the gaming system reveals a face-up card in each of a first additional hand and a second additional hand having the same suit and value as the held card in the player hand of cards. In the above example in which the first card, the third card and the fifth card of the player hand are designated as held cards, the example gaming system duplicates the first card, the third card and the fifth card of the player hand to the first additional hand and the second additional hand. The process 100 then proceeds to diamond 114. Responsive to the gaming system determining at diamond 114 that a draw input has not been received, the process 100 returns to diamond 108.

Responsive to the gaming system determining at diamond 114 that the draw input has been received, the gaming system determines whether the player hand includes any non-held cards, as diamond 115 indicates. Responsive to the gaming system determining at diamond 115 that the player hand does not include any non-held cards, the process 100 proceeds to block 120, described below. But responsive to the gaming system determining at diamond 115 that the player hand includes one or more non-held cards, the gaming system replaces each non-held card in the player hand with a replacement card randomly selected from the set of cards to complete the player hand, as block 116 indicates. For instance, the gaming system randomly selects the replacement card(s) from the cards remaining in the standard 52-card deck.

The gaming system then randomly selects additional cards from respective sets of a plurality of different cards to complete the additional hands, as block 118 indicates. For example, referring to the above example, the gaming system adds a face-up second card and a face-up fourth card to each of the first additional hand and the second additional hand. In this example embodiment, the gaming system adds the face-up cards to each of the additional hands by randomly selecting card(s) from sets of cards associated with each of the additional hands. Similar to the set of cards associated with the player hand, the respective sets of cards associated with each of the additional hands include the cards of a standard 52-card deck, and the gaming system randomly determines, and without replacement, the additional cards (e.g. the second and fourth cards in this example) to complete the additional hands. In this example embodiment, the gaming system forms the player hand, the first additional hand, and the second additional hand from separate yet initially identical sets of cards, though this may differ in other embodiments.

The gaming system selects a hand to process, as block 120 indicates. For example, the gaming system may select the primary hand, the first additional hand or the second additional hand to determine any awards to issue the player for the selected hand. However, it should be appreciated that in other embodiments, the gaming system may process two or more of the hands of the play in parallel.

The gaming system determines whether the selected hand satisfies a winning hand category of the paytable, as diamond 122 indicates. For example, the gaming system compares the cards of the player hand to the winning hand categories included in the example Table 1 above. Responsive to the gaming system determining at diamond 122 that the selected hand does not satisfy a winning hand category of the paytable, the process 100 proceeds to block 134 to determine whether there is another hand to process, as described below.

Responsive to the gaming system determining at diamond 122 that the selected hand satisfies a winning hand category of the paytable, the gaming system determines an award to issue the player for the selected hand based on the paytable. In this example embodiment, the gaming system awards credits to the player based on the current multiplier associated with the selected hand and the paytable. For example, if the current multiplier for the selected hand is "2×," then the gaming system multiplies the example award associated with the winning hand category of the selected hand by two (2).

In this example embodiment, the current multiplier (sometimes referred to herein as a "current modifier") is awarded to the player during a previous play of the game of a gaming session. A gaming session generally includes a plurality of plays of the wagering game. As described below in connection with block diamond 126, a multiplier is awarded for future plays during the gaming session. In this example embodiment, the multiplier bonus includes a plurality of multipliers, each of which is associated with a corresponding subsequent play of the wagering game. Accordingly, in this example embodiment, the current multiplier for the first play of a gaming session is "1×." Additionally, in this example embodiment, if the player does not trigger a multiplier bonus event (described below in connection with diamond 126), the current multiplier remains "1×" for the next play of the gaming session.

The gaming system then determines whether the selected hand triggers a multiplier bonus award for future plays during the gaming session, as diamond 126 indicates. In this example embodiment, the selected hand triggers a multiplier bonus award when (1) the player places a MAX wager for the play of the wagering game, and (2) the selected hand satisfies a winning hand category of a multiplier bonus awards paytable. Table 2 below includes an example multiplier bonus awards paytable per hand of a wagering game. The multiplier bonus awards paytable includes the different winning hand categories and multipliers associated with the winning hand categories. The winning hand categories are listed from highest to lowest ranking. The multipliers are listed per subsequent play. For example, applying the multiplier bonus awards paytable of Table 2, if the selected hand during a first play of the gaming session satisfies a Royal Flush, a Straight Flush, a Four of a Kind or a Full House, the player is awarded a multiplier bonus including a "2×" multiplier for the second play of the gaming session, a "3×" multiplier for the third play of the gaming session, a "4×" multiplier for the fourth play of the gaming session, an "8×" multiplier for the fifth play of the gaming session, and then a "12×" multiplier for the sixth play of the gaming session.

Similarly, applying the multiplier bonus awards paytable of Table 2, if the selected hand during a first play of the gaming session satisfies a Flush, a Straight or a Three of a Kind, the player is awarded a multiplier bonus including a "2×" multiplier for the second play of the gaming session, a "3×" multiplier for the third play of the gaming session, and a "4×" multiplier for the fourth play of the gaming session.

Similarly, applying the multiplier bonus awards paytable of Table 2, if the selected hand satisfies a Two Pair or a Jacks or Better, the player is not awarded a multiplier bonus for the next play of the wagering game during the gaming session (e.g., the current multiplier for the next play is "1×").

TABLE 2

Winning hand categories and multiplier bonus awards for example Jacks or Better Five Card Draw Poker

| Winning Hand Category | Multiplier Bonus Award |
|---|---|
| Royal Flush | 2x, 3x, 4x, 8x, 12x |
| Straight Flush | 2x, 3x, 4x, 8x, 12x |
| Four of a Kind | 2x, 3x, 4x, 8x, 12x |
| Full House | 2x, 3x, 4x, 8x, 12x |
| Flush | 2x, 3x, 4x |
| Straight | 2x, 3x, 4x |
| Three of a Kind | 2x, 3x, 4x |
| Two Pair | 1x |
| Jacks or Better | 1x |

Table 3 below includes an alternate multiplier bonus awards paytable per hand of a wagering game.

TABLE 3

Winning hand categories and multiplier bonus awards for example Jacks or Better Five Card Draw Poker

| Winning Hand Category | Multiplier Bonus Award |
|---|---|
| Royal Flush | 2x, 4x, 8x, 10x, 12x |
| Straight Flush | 2x, 4x, 8x, 10x, 12x |
| Four of a Kind | 2x, 4x, 8x, 10x, 12x |
| Full House | 2x, 4x, 8x, 10x, 12x |
| Flush | 2x, 4x, 8x |
| Straight | 2x, 4x, 8x |

TABLE 3-continued

Winning hand categories and multiplier bonus awards for example Jacks or Better Five Card Draw Poker

| Winning Hand Category | Multiplier Bonus Award |
|---|---|
| Three of a Kind | 2x, 4x |
| Two Pair | 1x |
| Jacks or Better | 1x |

For example, applying the multiplier bonus awards paytable of Table 3, if the selected hand during a first play of the gaming session satisfies a Royal Flush, a Straight Flush, a Four of a Kind or a Full House, the player is awarded a multiplier bonus including a "2×" multiplier for the second play of the gaming session, a "4×" multiplier for the third play of the gaming session, an "8×" multiplier for the fourth play of the gaming session, a "10×" multiplier for the fifth play of the gaming session, and then a "12×" multiplier for the sixth play of the gaming session.

Similarly, applying the multiplier bonus awards paytable of Table 3, if the selected hand during a first play of the gaming session satisfies a Flush or a Straight, the player is awarded a multiplier bonus including a "2×" multiplier for the second play of the gaming session, a "4×" multiplier for the third play of the gaming session, and an "8×" multiplier for the fourth play of the gaming session.

Similarly, applying the multiplier bonus awards paytable of Table 3, if the selected hand during a first play of the gaming session satisfies a Three of a Kind, the player is awarded a multiplier bonus including a "2×" multiplier for the second play of the gaming session and a "4×" multiplier for the third play of the gaming session.

Similarly, applying the multiplier bonus awards paytable of Table 3, if the selected hand satisfies a Two Pair or a Jacks or Better, the player is not awarded a multiplier bonus for the next play of the wagering game during the gaming session (e.g., the current multiplier for the next play of the gaming session is "1×").

Responsive to the gaming system determining at diamond 126 that the selected hand does not trigger a multiplier bonus award (e.g., the player did not place the MAX wager for the play of the wagering game and/or the selected hand does not satisfy a winning hand category of the multiplier bonus awards paytable (e.g., the example Table 2)), the process 100 proceeds to diamond 134 to determine whether there is another hand of the play of the wagering game to process.

Responsive to the gaming system determining at diamond 126 that the selected hand does trigger a multiplier bonus award, the gaming system determines whether the multiplier queue for the selected hand includes at least one multiplier, as diamond 128 indicates. In this example embodiment, a respective multiplier queue is associated with each hand of the play and indicates what multipliers, if any, the player has been awarded for future plays of that hand during the gaming session. That is, the multiplier queue visually identifies for the player what multipliers, if any, will be awarded to the player during the next play(s) of the wagering game.

Responsive to the gaming system determining at diamond 128 that the multiplier queue for the selected hand does not include a multiplier, then the gaming system adds the multipliers awarded to the player at diamond 126 to the multiplier queue of the selected hand, as block 130 indicates. For example, if the gaming system awards the player a multiplier bonus award including "2×," "3×" and "4×" multipliers based on a selected hand and the multiplier bonus awards paytable during a first play of the wagering game, then the "2×," "3×" and "4×" multipliers are added to the multiplier queue of the selected hand. The example process 100 then proceeds to diamond 134 to determine whether there is another hand to process, as described below.

Responsive to the gaming system determining at diamond 128 that the multiplier queue for the selected hand does include at least one multiplier, then the gaming system updates the new multiplier bonuses to a maximum multiplier bonus and adds the updated multiplier bonus awards to the multiplier queue. In this example embodiment, the maximum multiplier quantity is "12×." However, it should be appreciated that in various different embodiments of the present disclosure, the maximum multiplier could be any other number. In this example embodiment, the gaming system limits the number of bonus multipliers included in the multiplier queue to five multipliers. Accordingly, in this example embodiment, the gaming system keeps the five highest multiplier bonuses included in the multiplier queue and discards additional, if any, multiplier bonuses.

The gaming system then determines whether the current play of the wagering game includes another hand to process, as diamond 134 indicates. Responsive to the gaming system determining at diamond 134 that there is another hand to process, the process 100 returns to block 120 to select the hand to process. Otherwise, the example process 100 of FIG. 1 ends.

Example Gaming System Operation

Figure 2A:
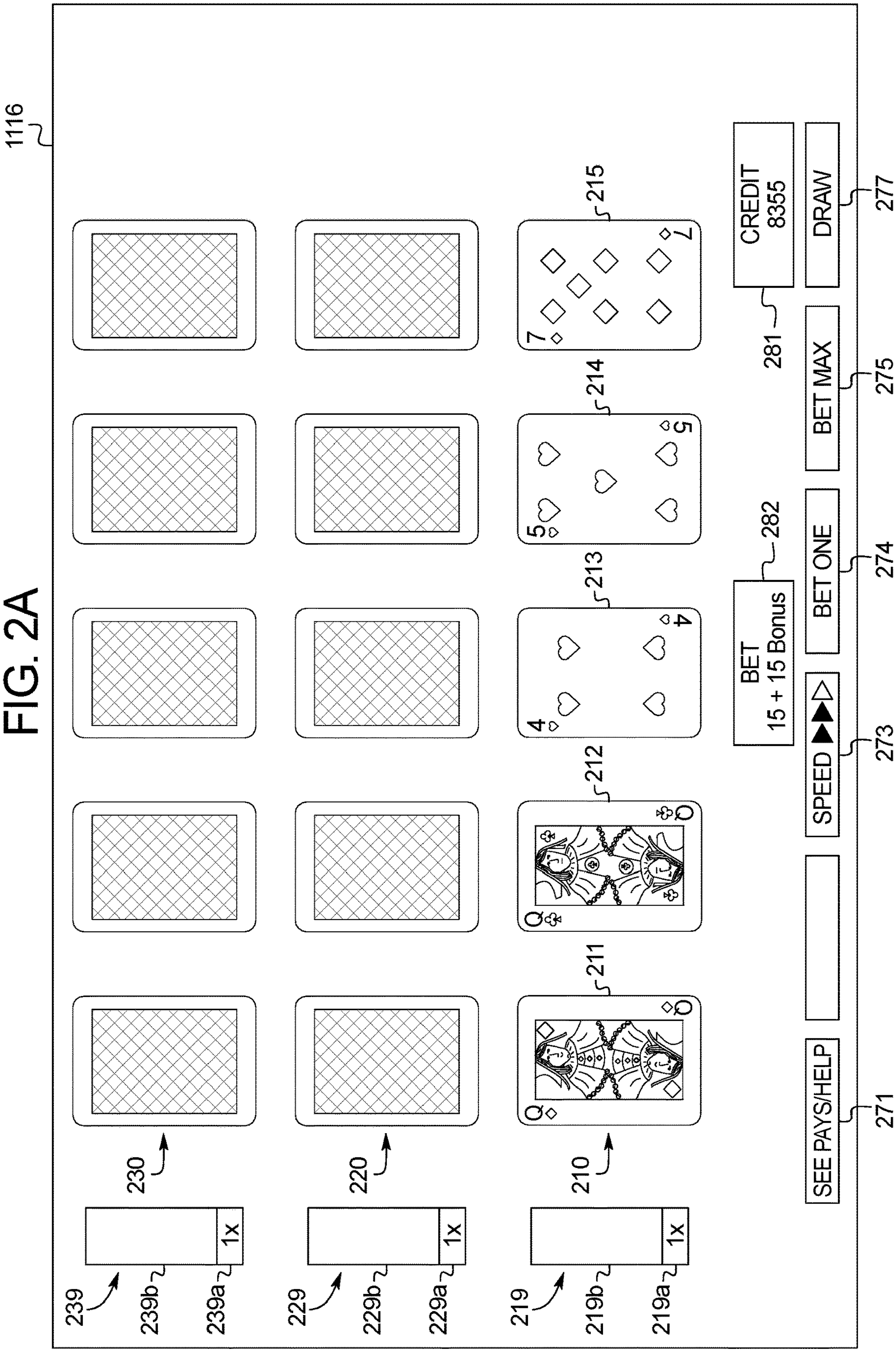
FIGS. 2A, 2B, and 2C illustrate screen shots of one example embodiment of a gaming system of the present disclosure providing a play of a gaming session of one example embodiment of the wagering game with the award modifier bonus feature of the present disclosure.
Figure 2B:
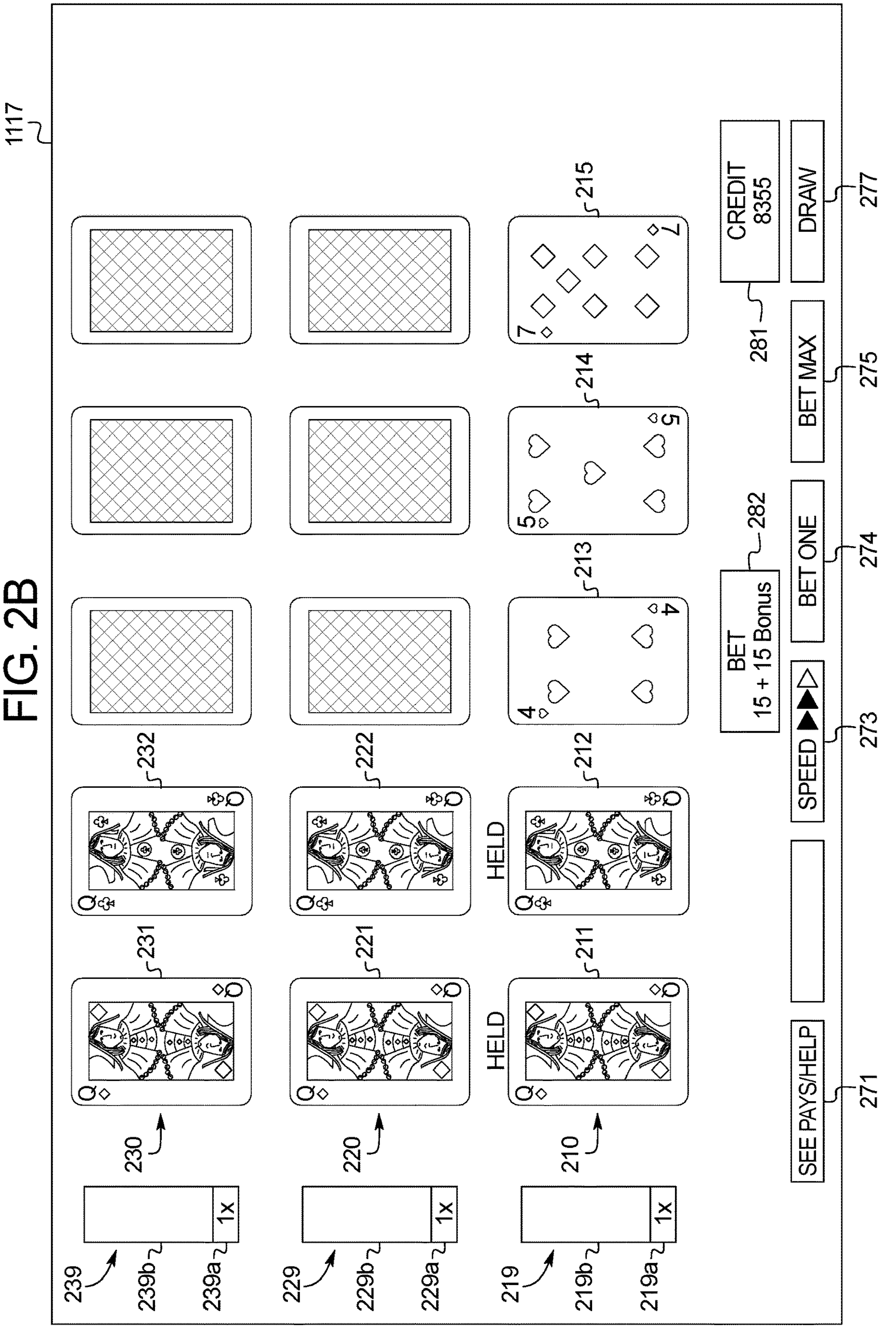
Figure 2C:
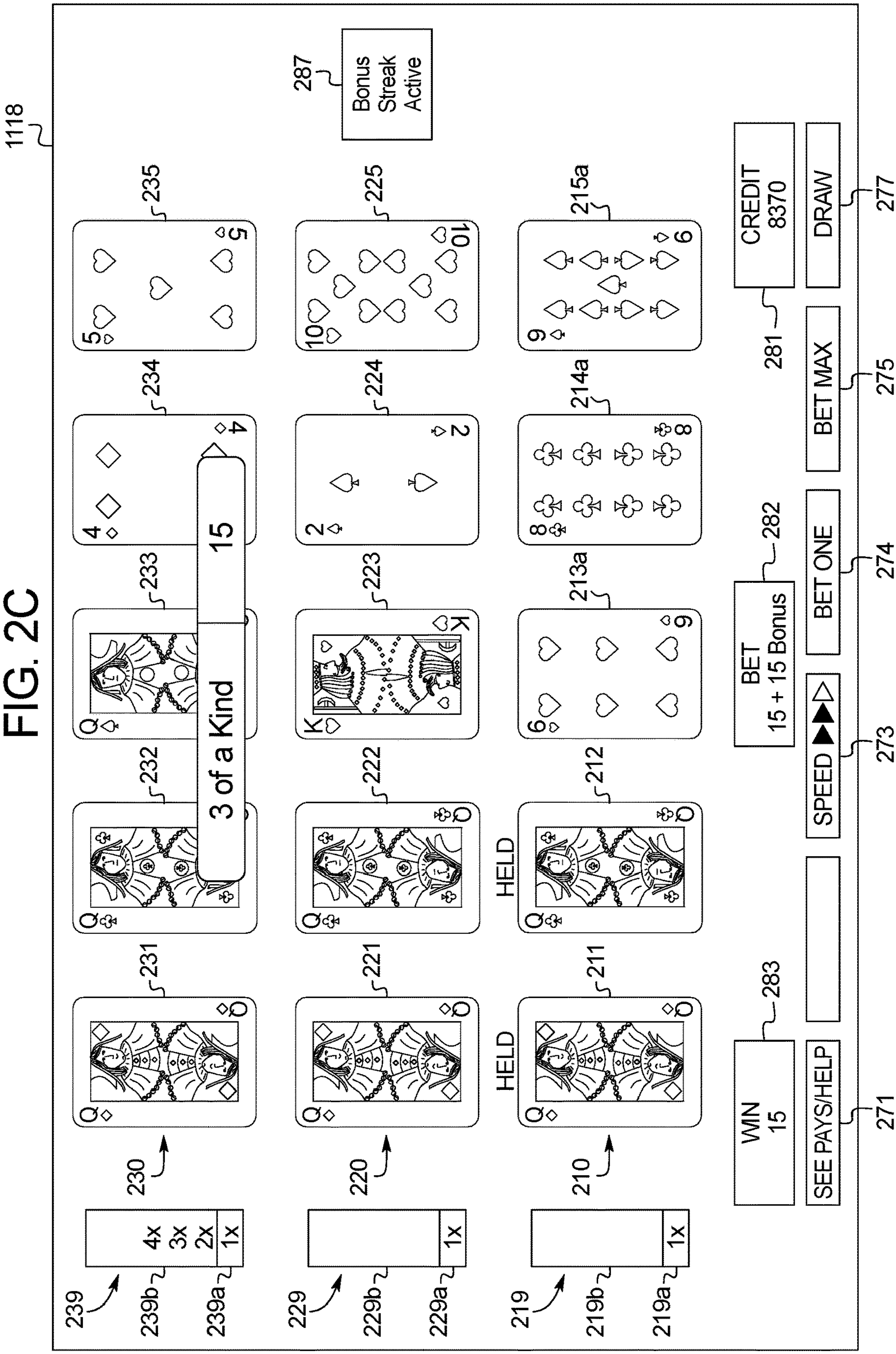
Figure 3:
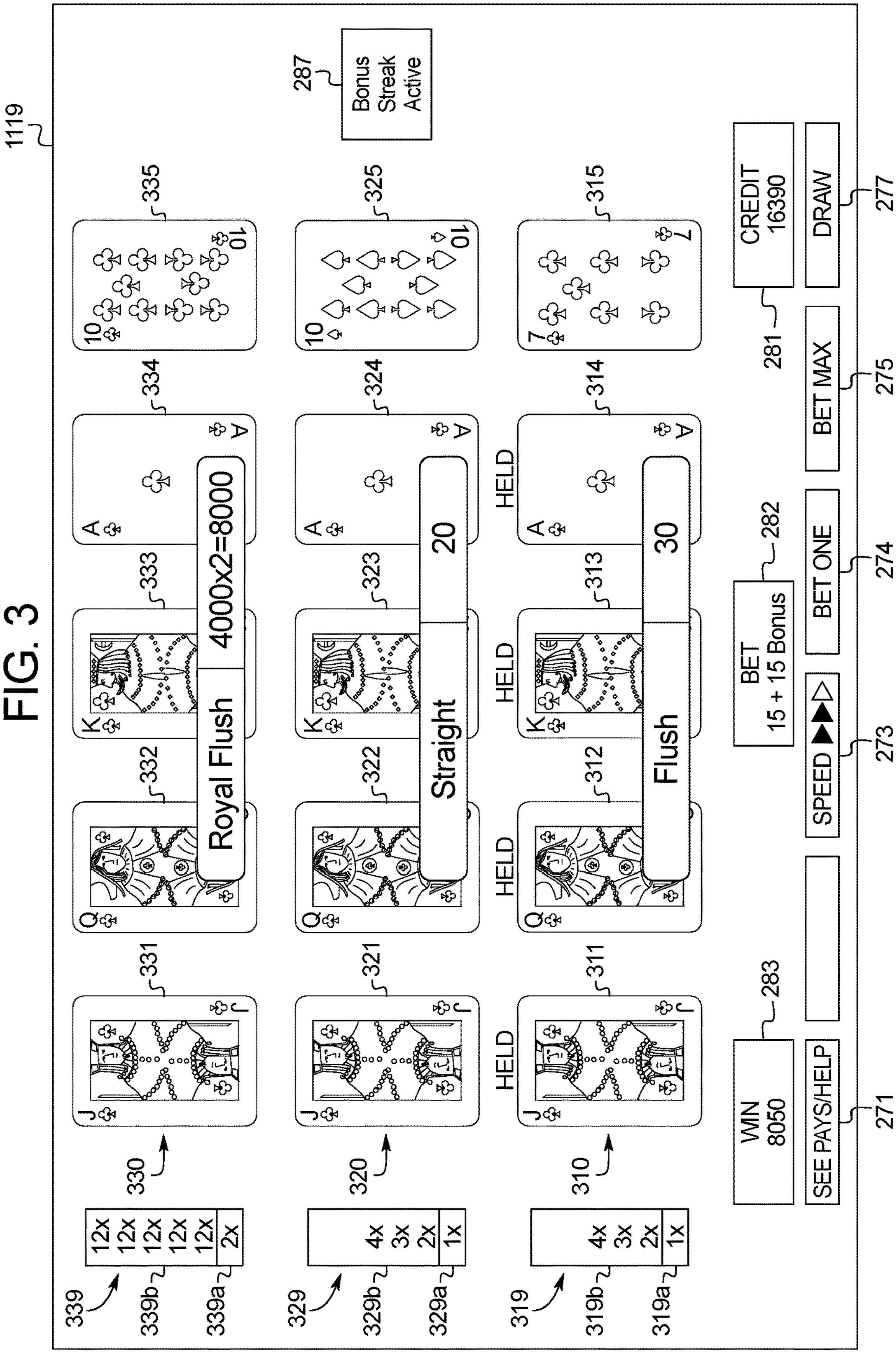
FIG. 3 illustrates a screen shot of another play during the gaming session of the wagering game with the award modifier bonus feature of this example embodiment of a gaming system of the present disclosure.
Figure 4:
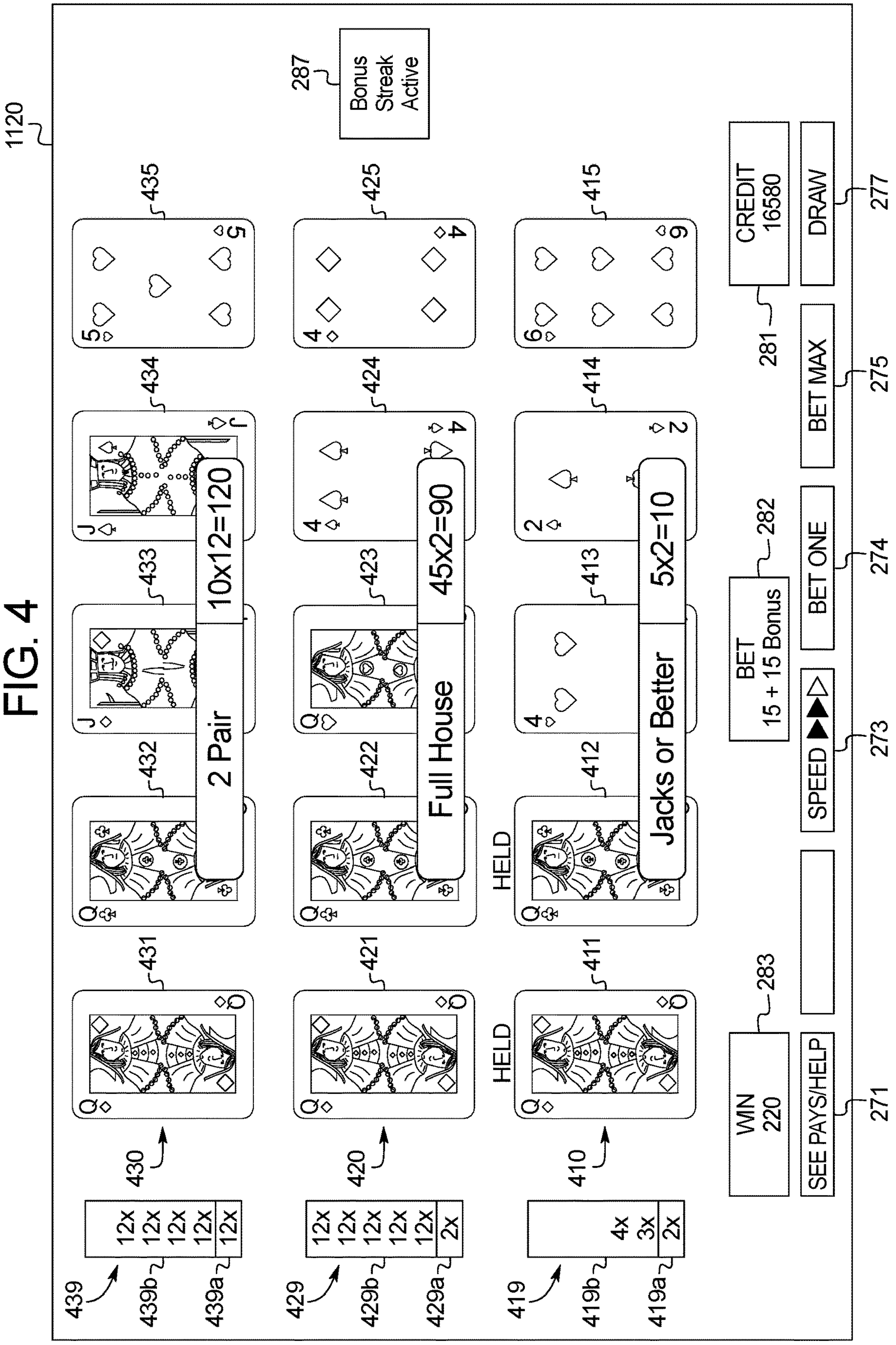
FIG. 4 illustrates a screen shot of another play during the gaming session of the wagering game with the award modifier bonus feature of this example embodiment of a gaming system of the present disclosure.

FIGS. 2A, 2B, 2C, 3, and 4 illustrate screen shots of an example embodiment of a gaming system of the present disclosure providing a gaming session, including a plurality of plays of one example embodiment of the wagering game with the award modifier bonus feature of the present disclosure. Specifically, FIGS. 2A, 2B, and 2C illustrate a first play of a gaming session of the wagering game, FIG. 3 illustrates a second play of the gaming session of the wagering game, and FIG. 4 illustrates a third play of the gaming session of the wagering game. Here, the wagering game is a Three-Hand Jacks or Better Five Card Draw Poker game (referred to below as the "poker game" for brevity). It should be appreciated that the number of additional hands as provided below can be any suitable number such as two or more hands.

In this example embodiment, to activate the award multiplier bonus feature for a play of the poker game, the gaming system requires placement of a maximum wager and payment of a multiplier bonus feature activation fee in addition to the maximum wager. Here, the maximum wager is 15 credits (5 credits on each of the three hands, though it may be any suitable amount), and the multiplier bonus feature activation fee is 15 credits (though it may be any suitable amount). In other embodiments, the gaming system requires placement of a particular wager (such as the maximum wager) to activate the multiplier bonus feature (i.e., to be able to earn multiplier bonuses for subsequent plays of the game). In other embodiments, the gaming system requires placement of a minimum wager and no payment of a multiplier bonus feature activation fee to activate the multiplier bonus feature. In further embodiments, the gaming system activates the multiplier bonus feature for each play of the poker game without requiring payment of a separate multiplier bonus feature activation fee or placement of a particular or minimum wager.

If the multiplier bonus feature is active for a given play of the poker game, the gaming system determines whether to award a multiplier bonus, including multipliers for one or more future plays of the poker game, based on a winning hand of the given play of the poker game, as described below. The multipliers increase the award issued to the player by a multiple. But if the multiplier bonus feature is not active for a given play of the poker game, the gaming system does not award a multiplier bonus, including multipliers, for future plays of any of the player hands for that play. However, the gaming system will still apply multipliers that have already or previously been awarded to the player for the current play of the poker game.

More specifically, in this example embodiment, responsive to determining that the multiplier bonus feature is active for a given play of the poker game, the gaming system determines whether a completed hand is a winning hand based on a paytable. The gaming system then awards the player an award based on (1) the winning hand combination, (2) the paytable, and (3) a current multiplier applicable to the completed hand. The current multiplier is a multiplier included in a multiplier bonus that was awarded to the player during a previous play of the poker game.

Responsive to the gaming system determining that the completed hand is a winning hand, the gaming system then determines whether to award the player a multiplier bonus including multipliers for one or more future plays of the gaming session based on a multiplier bonus awards paytable (e.g., the example multiplier bonus awards paytable of Table 2 above). The multiplier bonus awards paytable includes the different winning hand categories and multiplier bonus awards associated with the winning hand categories. The multiplier bonus awards include a plurality of multipliers that are awarded to the player for future plays of the poker game during a gaming session. For example, applying the multiplier bonus awards paytable of Table 2, if the selected hand during a first play of the gaming session satisfies a Royal Flush, a Straight Flush, a Four of a Kind or a Full House, the player is awarded a multiplier bonus including a "2×" multiplier for the second play of the gaming session, a "3×" multiplier for the third play of the gaming session, a "4×" multiplier for the fourth play of the gaming session, an "8×" multiplier for the fifth play of the gaming session, and a "12×" multiplier for the sixth play of the gaming session.

Similarly, applying the multiplier bonus awards paytable of Table 2, if the selected hand during a first play of the gaming session satisfies a Flush, a Straight or a Three of a Kind, the player is awarded a multiplier bonus including a "2×" multiplier for the second play of the gaming session, a "3×" multiplier for the third play of the gaming session, and a "4×" multiplier for the fourth play of the gaming session.

Similarly, applying the multiplier bonus awards paytable of Table 2, if the selected hand satisfies a Two Pair or a Jacks or Better, the player is not awarded a multiplier bonus for the next play of the wagering game during the gaming session (e.g., the current multiplier for the next play is "1×").

In this example embodiment, multiplier bonuses, including multipliers that are awarded to the player for future plays of the poker game, are displayed, via a display device, in a multiplier queue. If, during a given play of the poker game, the gaming system determines (1) the multiplier bonus feature is activated, (2) the completed hand satisfies a winning hand combination included in the multiplier bonus awards paytable, and (3) the multiplier queue includes at least one multiplier, then the gaming system maximizes the multiplier(s) included in the multiplier queue. For example, in this example embodiment, the gaming system updates the new multipliers to "12×" and adds them to the multiplier queue. It should be appreciated that in other embodiments, the gaming system may update the multiplier(s) of the multiplier queue using different techniques.

Before or during play of the poker game, at various points the gaming system displays one or more of a plurality of buttons actuatable via a touch screen including: (1) a SEE PAYS/HELP button 271, (2) a MORE GAMES button 272, (3) a SPEED button 273, (4) a BET ONE button 274, (5) a BET MAX button 275, and (6) a DEAL/DRAW button 277. Responsive to the gaming system receiving an actuation of the SEE PAYS/HELP button 271, the gaming system displays an interactive menu that includes the rules of the poker game. Responsive to the gaming system receiving an actuation of the MORE GAMES button 272, the gaming system displays an interactive menu of additional games the player can play via the gaming system. Responsive to the gaming system receiving an actuation of the SPEED button 273, the gaming system modifies the speed at which the gaming system displays plays of the poker game. Responsive to the gaming system receiving an actuation of the BET ONE button 274, the gaming system increases the player wager by 1 credit per hand. Responsive to the gaming system receiving an actuation of the BET MAX button 275, the gaming system increases the player wager to 5 credits per hand. Responsive to the gaming system receiving an actuation of the DEAL/DRAW button 277 before a play of the poker game has been initiated, the gaming system places a wager and initiates a play of the poker game. Responsive to the gaming system receiving an actuation of the DEAL/DRAW button 277 after a play of the poker game has been initiated, the gaming system replaces any non-held cards with replacement cards, and, if necessary adds one or more cards to the additional hands so each additional hand includes five cards, as described below.

Before or during play of the poker game, at various points the gaming system displays a plurality of meters including: (1) a credit meter 281 that indicates the player credit balance, (2) a wager meter 282 that displays the player total wager for a play of the poker game and the multiplier bonus feature activation fee (if paid), and (3) an award meter 283 that displays any awards won for a play of the poker game. While in this example embodiment the gaming system indicates the player credit balance, the player wager, and any awards in credits, the gaming system may also indicate them in currency (e.g., U.S. dollars).

The gaming system also displays, for each hand of the play of the poker game, a multiplier meter that identifies (1) a current multiplier that is applicable to a current play of the poker game and (2) a multiplier queue including multipliers for future plays of the poker game. In this example embodiment, when no multiplier is applicable for a given hand, the gaming system sets the current multiplier as "1×" to be applied to any awards for the respective hand.

FIG. 2A is a screenshot 1116 of the gaming system after the gaming system: (1) received an actuation of the DEAL/DRAW button 277; (2) initiated a play of the poker game, placed a 15 credit wager (5 credits per hand) on the play of the poker game, deducted the 15 credit wager from the credit balance, and deducted a 15 credit multiplier bonus feature activation fee from the credit balance; and (3) randomly determined five initial cards (e.g., a Q♦ 211, a Q♣ 212, a 4♥ 213, a 5♥ 214 and a 7♦ 215) from a primary set of cards and added them to a primary hand 210. In this example embodiment, the primary set of cards includes the cards of a standard 52-card deck. The primary set of cards may include any suitable quantity of any suitable cards in other embodiments.

The given play of the poker game of this example embodiment also includes a first additional hand 220 and a second additional hand 230 with placeholders for cards to eventually be in these hands (e.g., when the hands are completed). Each of the additional hands 220 and 230 is associated with respective sets of cards that include the cards of a standard 52-card deck. The respective sets of cards for the additional hands 220 and 230 may include any suitable quantity of any suitable cards in other embodiments.

In this example embodiment, the primary hand 210 is associated with a primary multiplier meter 219. The primary multiplier meter 219 includes a current multiplier identifier 219*a* that identifies a current multiplier for the primary hand 210 during a given play of the poker game. The primary multiplier meter 219 also includes a multiplier queue 219*b* that identifies one or more multipliers for future plays of the poker game. In this example embodiment, the current multiplier identifier 219*a* indicates that the current multiplier for the primary hand 210 during the current play of the poker game is "1×," and the multiplier queue 219*b* indicates that the player has not been awarded any multipliers for future plays of the poker game. In other embodiments, there is no multiplier queue associated with the primary hand, but, rather, there are multiplier queues associated with the additional hands.

Similarly, in this example embodiment, the first additional hand 220 and the second additional hand 230 are each associated with respective multiplier meters 229 and 239. The respective multiplier meters 229 and 239 include a current multiplier identifier 229*a* and 229*a*, respectively, and a multiplier queue 229*b* and 239*b*, respectively. In this example embodiment, the current multiplier identifier 229*a* indicates that the current multiplier bonus for the first additional hand 220 during the current play of the poker game is "1×," and the current multiplier identifier 239*a* indicates that the current multiplier bonus for the second additional hand 230 during the current play of the poker game is also "1×."

The gaming system enables the player to choose one or more of the initially dealt cards 211, 212, 213, 214, and 215 of the primary hand 210 to hold. The player may choose to hold up to all of the initially dealt cards 211, 212, 213, 214, and 215 of the primary hand 210. As described below, the gaming system discards any non-held cards from the primary hand 210 and replaces any non-held cards with replacement cards from the cards remaining in the primary set of cards.

FIG. 2B illustrates an example screenshot 1117 in which the gaming system receives a selection of the Q♦ 211 and the Q♣ 212 from the primary hand 210 to hold and designates those cards as held cards. In this example embodiment, the gaming system duplicates each held card from the primary hand 210 to each additional hand 220 and 230. Accordingly, the gaming system displays the first incomplete additional hand 220 including a Q♦ 221 and a Q ♣ 222. The gaming system displays the second incomplete additional hand 220 including a Q♦ 231 and a Q♣ 232. The gaming system receives an actuation of the DEAL/DRAW button 277.

The gaming system then replaces any non-held cards of the primary hand with replacement cards, and, if necessary, adds one or more cards to the additional hands so that they each include five cards (e.g., completes the hands). More specifically, as illustrated in an example screenshot 1118 of FIG. 2C, responsive to the actuation of the DEAL/DRAW button 277, the gaming system randomly determines replacement cards (e.g., a 6♥ 213*a*, an 8Q♣ 214*a* and a 9 ♠ 215*a*) from the cards remaining in the primary set of cards and replaces the non-held cards (e.g., the 4♥ 213, the 5♥ 214 and the 7♦ 215) with the replacement cards (e.g., the 6♥ 213*a*, the 8♣ 214*a* and the 9♠ 215*a*).

The gaming system then adds cards to each of the first and second additional hands 220 and 230 so that each additional hand 220 and 230 includes five cards. Specifically, the gaming system completes the first additional hand 220 by randomly selecting three cards (e.g., a K♥ 223, a 2♠ 224 and a 10♥ 225) from a first additional set of cards that includes the cards of a standard 52-card deck without the cards already included in the first additional hand 220 (e.g., the Q♦ 221 and the Q♣ 222). The first additional set of cards may include any suitable quantity of any suitable cards in other embodiments.

Similarly, the gaming system completes the second additional hand 230 by randomly selecting three cards (e.g., a Q ♠ 233, a 4♦ 234 and a 5♥ 235) from a second additional set of cards that includes the cards of a standard 52-card deck without the cards already included in the second additional hand 230 (e.g., the Q♦ 231 and the Q♣ 232). The second additional set of cards may include any suitable quantity of any suitable cards in other embodiments.

In this example embodiment, the gaming system forms the primary hand 210, the first additional hand 220, and the second additional hand 230 from separate yet initially identical sets of cards, though this may differ in other embodiments.

After each hand includes five cards, the gaming system selects a hand to process. In this example embodiment, for each hand 210, 220, and 230, the gaming system (1) determines whether to issue an award to the player for the current play of the poker game, and (2) in response to determining to issue an award to the player, determines whether to award a multiplier bonus including multipliers for future plays of the poker game. In this example embodiment, the gaming system determines whether to issue an award to the player for the current play of the poker game based on the cards in the selected hand and the paytable of the poker game (e.g., the example Table 1 above). In this example embodiment, the gaming system determines whether to award a multiplier bonus, including multipliers for further plays of the poker game, based on the cards in the selected hand and the multiplier bonus awards paytable (e.g., the example Table 2 above).

In this example embodiment, the primary hand 210 and the first additional hand 220 fail to win an award (e.g., are losing hands) as the cards in the primary hand 210 and the first additional hand 220 do not satisfy any of the winning hand categories in the paytable of Table 1 above. The second additional hand 230 forms a Three of a Kind (Queens) associated with a 15 credit award. The gaming system then applies the current multiplier for the second additional hand 230 (e.g., "1×"), identified via the current multiplier identifier 239*a* of the multiplier meter 239, to the 15 credit award associated with the Three of a Kind winning category and awards the player 15 credit awards.

In this example embodiment, the gaming system displays the 15 credit award in the award meter 283 and increases the credit balance by the 15 credits (e.g., the credit meter 281 displays 8370 credits available) to reflect the awards.

The gaming system then determines whether to award the player a multiplier bonus including one or more multiplier(s) for future plays of the poker game. In this example embodiment, the gaming system awards a multiplier bonus when (1) the multiplier bonus feature is activated, and (2) the respective hand satisfies a winning hand category included in the multiplier bonus awards paytable (e.g., the example multiplier bonus awards paytable of Table 2 above). In this example embodiment, the gaming system determines that the Three of a Kind (Queens) of the second additional hand 230 satisfies a winning hand category of the multiplier bonus awards paytable of Table 2 and awards the player a multiplier bonus including three multipliers for the next three plays of the poker game (e.g., a "2×" multiplier for the next play, followed by a "3×" multiplier for the next play and followed by a "4×" multiplier for the next play). Responsive to the gaming system determining to award the player a multiplier bonus, the gaming system also displays a "Bonus Streak Active" sticker 287 to indicate that the player has an active streak of multiplier bonuses.

In this example embodiment, when a given hand satisfies a winning hand category included in the example multiplier bonus awards paytable of Table 2, the gaming system determines whether there is a bonus streak active for the given hand. For example, the gaming system determines whether the multiplier queue associated with the given hand includes at least one multiplier. For example, in this example embodiment, the gaming system determines whether the multiplier queue 239*b* includes at least one multiplier. In this instance, because the multiplier queue 239*b* does not include any multipliers (as shown in the example screenshot 1117 of FIG. 2B), the gaming system adds the awarded multipliers (e.g., the "2×," the "3×," and the "4×" multipliers) to the multiplier queue 239*b*.

FIG. 3 illustrates a screenshot 1119 of a second play of the poker game during the gaming session. In this example embodiment, the player has selected which cards of a primary hand 310 to hold (e.g., a J♣ 311, a Q♣ 312, a K ♣ 313 and an A♣ 314), and the gaming system has replaced non-held cards in the primary hand 310 with replacement cards (e.g., replaced a non-held card with a replacement card 7♣ 315). The gaming system duplicated the held cards to a first additional hand 320 (e.g., by duplicating a J♣ 321, a Q ♣ 322, a K♣ 323 and an A♣ 324 to the first additional hand 320). The gaming system also added a 10♠ 325 to complete the first additional hand 320.

Similarly, the gaming system duplicated the held cards of the primary hand 310 to a second additional hand 330 (e.g., by duplicating a J♣ 331, a Q♣ 332, a K♣ 333 and an A ♣ 334 to the second additional hand 330). The gaming system also added 10♣ 335 to complete the second additional hand 330.

In this example embodiment, for each hand, the gaming system then (1) determines whether to issue an award to the player for the current play of the poker game, and (2) in response to determining to issue an award to the player, determines whether to award a multiplier bonus including one or more multiplier(s) for future plays of the poker game.

In this example embodiment, the gaming system determines that the primary hand 310 forms a Flush associated with 30 credit awards. The gaming system applies the current multiplier (e.g., "1×") associated with the primary hand 310, and identified via a current multiplier identifier 319*a* of a primary multiplier meter 319, to the 30 credits and awards the player 30 credit awards for the primary hand 310. The gaming system also determines that the Flush hand of the primary hand 310 satisfies a winning hand category of the multiplier bonus awards paytable of Table 2 and awards the player a multiplier bonus including three multipliers for the next three plays of the poker game (e.g., a "2×" multiplier for the next play, followed by a "3×" multiplier for the next play, and followed by a "4×" multiplier for the next play).

The gaming system then determines that a multiplier queue 319*b* of the primary multiplier meter 319 associated with the primary hand 310 does not include any multipliers and, accordingly, adds the newly awarded multiplier bonus (e.g., the "2×," the "3×," and the "4×" multipliers) to the multiplier queue 319*b*. Responsive to the gaming system determining to award the player multipliers for future plays, the gaming system also displays the "Bonus Streak Active" sticker 287.

Similarly, the gaming system determines that the first additional hand 320 forms a Straight associated with 20 credit awards. The gaming system applies the current multiplier (e.g., "1×") associated with the first additional hand 320, and identified via a current multiplier identifier 329*a* of a first additional multiplier meter 329, to the 20 credits and awards the player 20 credit awards for the first additional hand 320. The gaming system also determines that the Straight hand of the first additional hand 320 satisfies a winning hand category of the multiplier bonus awards paytable of Table 2 and awards the player a multiplier bonus including three multipliers for the next three plays of the poker game (e.g., a "2×" multiplier for the next play, followed by a "3×" multiplier for the next play, and followed by a "4×" multiplier for the next play).

The gaming system then determines that a multiplier queue 329*b* of the first additional multiplier meter 329 associated with the first additional hand 220 did not include any multipliers and, accordingly, adds the awarded multiplier bonus (e.g., the "2×," the "3×," and the "4×" multiplier) to the multiplier queue 329*b*.

Similarly, the gaming system determines that the second additional hand 330 forms a Royal Flush associated with 4000 credit awards. The gaming system applies the current multiplier (e.g., "2×") associated with the second additional hand 330, and identified via a current multiplier identifier 339*a* of a second additional multiplier meter 339, to the 4000 credits and awards the player 8000 (e.g., 4000×2=8000) credit awards for the second additional hand 330. The gaming system also determines that the Royal Flush hand of the second additional hand 330 satisfies a winning hand category of the multiplier bonus awards paytable of Table 2 and awards the player a multiplier bonus including five multipliers for the next five plays of the poker game (e.g., a "2×" multiplier for the next play, followed by a "3×" multiplier for the next play, followed by a "4×" multiplier for the next play, followed by an "8×" multiplier for the next play, and a "12×" multiplier for the next play).

In this example embodiment, the gaming system determines that a multiplier queue 339*b* of the second additional multiplier meter 339 associated with the second additional hand 330 includes at least one multiplier (e.g., a "3×" multiplier and a "4×" multiplier included in the example screenshot 1118 of FIG. 2C). Accordingly, in this example embodiment, the gaming system maximizes the new multipliers (e.g., the "2×," the "3×," the "4×," the "8×," and the "12×" multipliers) and inserts the maximized multipliers into the multiplier queue 339*b*. For example, the maximum bonus multiplier for a play of the poker game may be "12×" and, thus, the gaming system updates the new multipliers each to "12×." The gaming system then retains the five highest multipliers in the multiplier queue 339*b* and deletes any additional multipliers, if any, from the multiplier queue 339*b*. In some example embodiments, the gaming system may sort the remaining multipliers in the multiplier queue 339*b* so that lower-valued multipliers (e.g., a "2×" multiplier) are applied before higher-values multipliers (e.g., a "12×" multiplier). The gaming system then causes the display device to display the multipliers in the multiplier queue 339*b* in ascending order.

In this example embodiment, the gaming system displays the total credits awarded (e.g., 30+20+8000=8050 credits) in the award meter 283 and increases the credit balance by the 8050 credits (e.g., the credit meter 281 displays 16390 credits available) to reflect the awards.

FIG. 4 illustrates a screenshot 1120 of a third play of the poker game during the same gaming session of FIGS. 2A, 2B, 2C, and 3. In this example embodiment, the player has selected which cards of a primary hand 410 to hold (e.g., a Q♦ 411 and a Q♣ 412), and the gaming system has replaced non-held cards in the primary hand 410 with replacement cards (e.g., added a replacement card 4♥ 413, a replacement card 2♠ 414, and a replacement card 6♥ 415).

The gaming system also duplicated the held cards of the primary hand 410 to a first additional hand 420 (e.g., by duplicating a Q♦ 421 and a Q♣ 422 to the first additional hand 420). The gaming system also added a Q♥ 423, a 4 ♠ 424 and a 4♦ 425 to complete the first additional hand 420.

Similarly, the gaming system duplicated the held cards of the primary hand 410 to a second additional hand 430 (e.g., by duplicating a Q♦ 431 and a Q♣ 432 to the second additional hand 430). The gaming system also added a J♦ 433, a J♠ 434, and a 5♥ 435 to complete the second additional hand 430.

In this example embodiment, for each hand, the gaming system then (1) determines whether to issue an award to the player for the current play of the poker game, and (2) in response to determining to issue an award to the player, determines whether to award multiplier bonus including one or more multipliers associated with future plays of the poker game.

In this example embodiment, the gaming system determines that the primary hand 410 forms a Jacks or Better (Queens) associated with 5 credit awards. The gaming system applies the current multiplier (e.g., "2×") associated with the primary hand 410, and identified via a current multiplier identifier 419*a* of a primary multiplier meter 419, to the 5 credits and awards the player 10 (e.g., 5×2=10) credit awards for the primary hand 410. The gaming system also determines that the Jacks or Better (Queens) hand of the primary hand 410 does not satisfy a winning hand category of the multiplier bonus awards paytable of Table 2. Accordingly, the gaming system does not add any new multipliers to a multiplier queue 419*b* of the primary multiplier meter 419. The gaming system also does not update any of the multipliers, if any, included in the multiplier queue 419*b*. In this example embodiment, the multiplier queue 419*b* retains the previously included "3×" and "4×" multipliers in the multiplier queue 419*b*. However, because the multiplier queue 419*b* includes a multiplier, the gaming system also displays the "Bonus Streak Active" sticker 287.

Similarly, the gaming system determines that the first additional hand 420 forms a Full House associated with 45 credit awards. The gaming system applies the current multiplier (e.g., "2×") associated with the first additional hand 420, and identified via a current multiplier identifier 429*a* of a first additional multiplier meter 429, to the 45 credits and awards the player 90 (e.g., 45×2=90) credit awards for the first additional hand 420. The gaming system also determines that the Full House hand of the first additional hand 420 satisfies a winning hand category of the multiplier bonus awards paytable of Table 2 and awards the player a multiplier bonus including five multipliers for the next five plays of the poker game (e.g., a "2×" multiplier for the next play, followed by a "3×" multiplier for the next play, followed by a "4×" multiplier for the next play, followed by an "8×" multiplier for the next play, and a "12×" multiplier for the next play).

In this example embodiment, the gaming system determines that a multiplier queue 429*b* of the first additional multiplier meter 429 associated with the first additional hand 420 includes at least one multiplier (e.g., a "3×" multiplier and a "4×" multiplier included in the example screenshot 1119 of FIG. 3). Accordingly, in this example embodiment, the gaming system maximizes the new multipliers (e.g., the "2×," the "3×," the "4×," the "8×," and the "12×" multipliers) and inserts the maximized multipliers into the multiplier queue 429*b*. For example, the maximum multiplier for a play of the poker game may be "12×" and, thus, the gaming system updates the new multipliers each to "12×." The gaming system then retains the five highest multipliers in the multiplier queue 429*b* and deletes any additional multipliers, if any, from the multiplier queue 429*b*. In some example embodiments, the gaming system may sort the remaining multipliers in the multiplier queue 429*b* so that lower-valued multipliers (e.g., a "2×" multiplier) are applied before higher-values multipliers (e.g., a "12×" multiplier).

Similarly, the gaming system determines that the second additional hand 430 forms a Two Pair associated with 10 credit awards. The gaming system applies the current multiplier (e.g., "12×") associated with the second additional hand 430, and identified via a current multiplier identifier 439*a* of a second additional multiplier meter 439, to the 10 credits and awards the player 120 (e.g., 10×12=120) credit awards for the second additional hand 430. The gaming system also determines that the Two Pair hand of the second additional hand 430 does not satisfy a winning hand category of the multiplier bonus awards paytable of Table 2.

Accordingly, the gaming system does not add any new multipliers to a multiplier queue 439*b* of the second additional multiplier meter 439. The gaming system also does not update any of the multipliers included in the multiplier queue 439*b*. In this example embodiment, the multiplier queue 439*b* retains the previously included "12×, "12×," "12×" and "12×" multipliers in the multiplier queue 439*b*.

In this example embodiment, the gaming system displays the total credits awarded (e.g., 10+90+120=220 credits) in the award meter 283 and increases the credit balance by the 220 credits (e.g., the credit meter 281 displays 16580 credits available) to reflect the awards.

Variations

In other various embodiments, the gaming system awards multiplier bonus awards for different variations of the wagering game. For example, in other embodiments, such as when playing a Deuces Wild wagering game, the multiplier bonus awards may be awarded to the player if the selected hand is a Flush or higher ranked hand.

In the current embodiments, the multipliers are limited to five multipliers in the respective multiplier queues. In other embodiments, the quantity of multipliers may be less, greater or unlimited.

In the current embodiments, when a player has a bonus streak active for a given hand (e.g., the corresponding multiplier queue includes at least one multiplier) and the given hand satisfies a winning hand category of the multiplier bonus awards paytable of Table 2, the gaming system maximizes (e.g., sets to "12×") the newly awarded multipliers and then adds them to the multiplier queue. In other embodiments, the gaming system may additionally or alternatively maximize the multipliers already included in the multiplier queue.

In other embodiments, the gaming system may combine the newly awarded multipliers and the multipliers included in the multiplier queue. For example, if the multiplier queue includes a "2×" multiplier for the next play and a "3×" multiplier for the following play, and the player is awarded new "2×," "3×" and "4×" multipliers for the next three plays, respectively, the gaming system may take the product of the corresponding multipliers for each play and update the multiplier queue to include the products. For example, the gaming system may update the multiplier queue to include a "4×" (e.g., 2×2=4) multiplier for the next play, a "9×" (e.g., 3×3=9) multiplier for the following play, and a "4×" multiplier for the following play.

In other embodiments, the gaming system may replace current multipliers included in the multiplier queue with the newly awarded multipliers.

In other embodiments, the gaming system maximizes the multipliers already included in the multiplier queue and adds the newly awarded multipliers to the multiplier queue.

In the current embodiments, the gaming system sorts the multipliers included in each multiplier queue at the end of each play. For example, the gaming system sorts the multipliers from low to high so that the lowest multipliers are played before the relatively higher multipliers (e.g., in ascending order). In other embodiments, the gaming system may sort the multipliers in the multiplier queue from high to low so that the relatively high multipliers are played before the relatively lower multipliers (e.g., in descending order). In other embodiments, the gaming system may not sort the multipliers (e.g., the multipliers included in the multiplier queue are played in the other that they are awarded).

In the current embodiments, the modifier is a multiplier (e.g., "2×," "3×," "4×," etc.). However, it should be appreciated that other modifiers may additionally or alternatively be used. For example, in some embodiments, the modifier may a quantity. For example, a modifier bonus may include a plurality of quantities that are awarded for future plays of the wagering game (e.g., the player is awarded a bonus of 50 credits for a first play, a bonus of 75 credits for a second play, and a bonus of 100 credits for a third play of the wagering game).

The present disclosure contemplates that:

(a) the quantity of cards available per hand; and/or (b) any other variables or determinations described herein may be: (1) predetermined; (2) randomly determined; (3) randomly determined based on one or more weighted percentages (such as according to a weighted table); (4) determined based on a generated symbol or symbol combination; (5) determined independent of a generated symbol or symbol combination; (6) determined based on a random determination by a central controller (described below); (7) determined independent of a random determination by the central controller; (8) determined based on a random determination at an EGM; (9) determined independent of a random determination at the EGM; (10) determined based on at least one play of at least one game; (11) determined independent of at least one play of at least one game; (12) determined based on a player's selection; (13) determined independent of a player's selection; (14) determined based on one or more side wagers placed; (15) determined independent of one or more side wagers placed; (16) determined based on the player's primary game wager or wager level; (17) determined independent of the player's primary game wager or wager level; (18) determined based on time (such as the time of day); (19) determined independent of time (such as the time of day); (20) determined based on an amount of coin-in accumulated in one or more pools; (21) determined independent of an amount of coin-in accumulated in one or more pools; (22) determined based on a status of the player (i.e., a player tracking status); (23) determined independent of a status of the player (i.e., a player tracking status); (24) determined based on one or more other determinations disclosed herein; (25) determined independent of any other determination disclosed herein; or (26) determined in any other suitable manner or based on or independent of any other suitable factor(s).

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, the term "EGM" is used herein to refer to an electronic gaming machine (such as a slot machine, a video poker machine, a video lottery terminal (VLT), a video keno machine, or a video bingo machine located on a casino floor). Additionally, for brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

Figure 5:
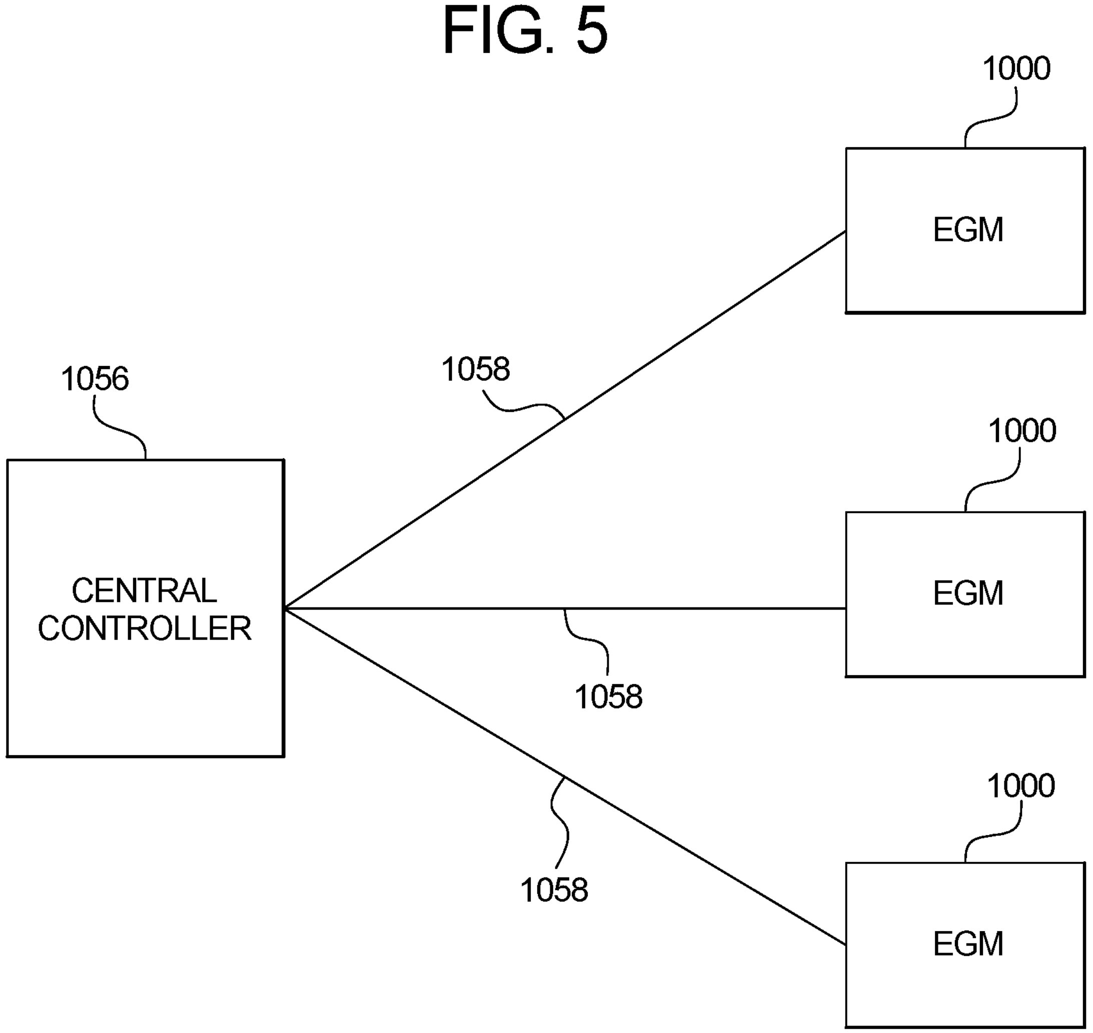
FIG. 5 is a schematic block diagram of one embodiment of a network configuration of one example embodiment of the gaming system of the present disclosure.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system illustrated in FIG. 5 includes a plurality of EGMs 1000 that are each configured to communicate with a central server, central controller, or remote host 1056 through a data network 1058.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the data network is a WAN, the gaming system includes a central server, central controller, or remote host and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server," which are incorporated herein by reference.

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 6:
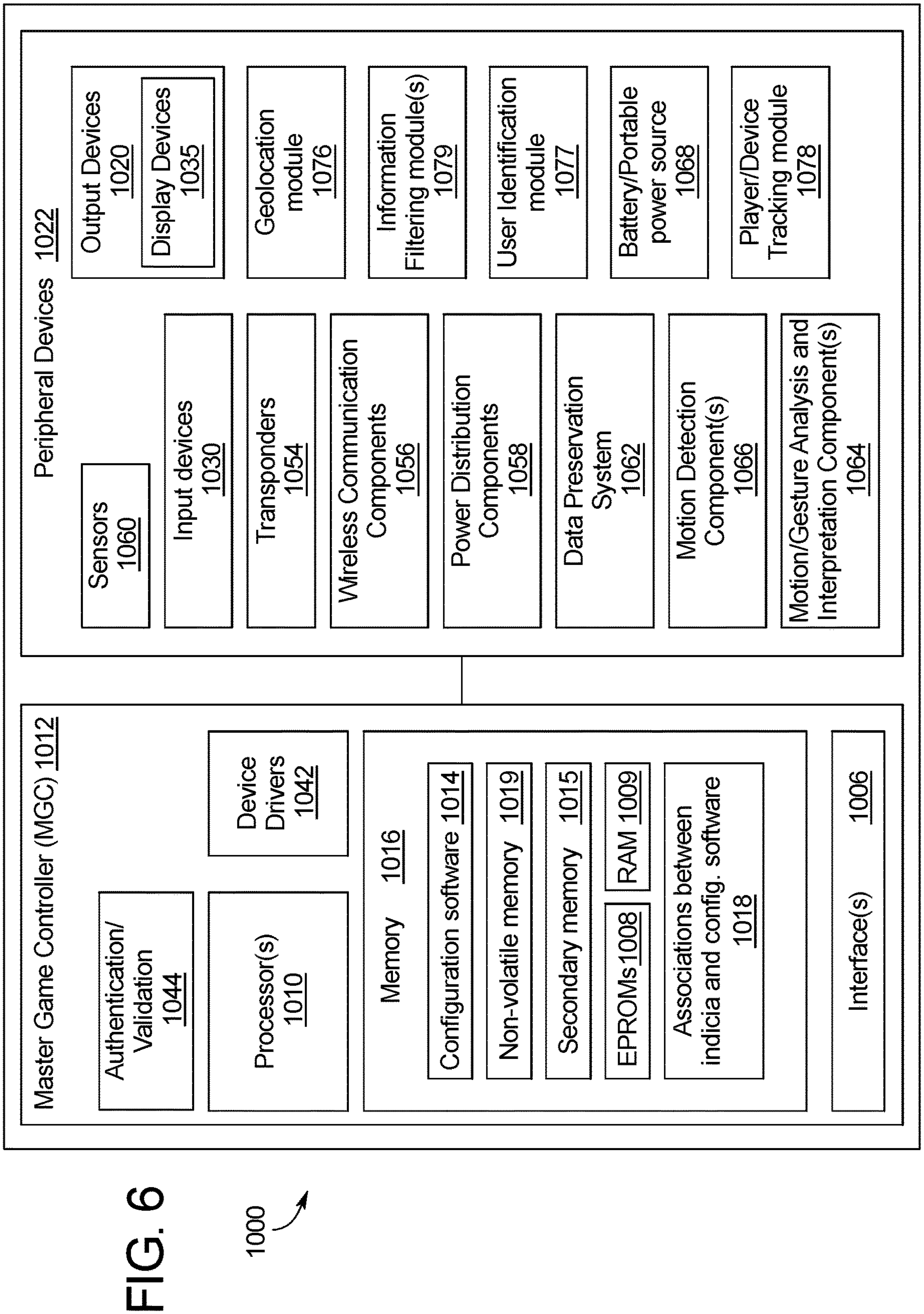
FIG. 6 is a schematic block diagram of an electronic configuration of one example embodiment of the gaming system of the present disclosure.
Figure 7A:
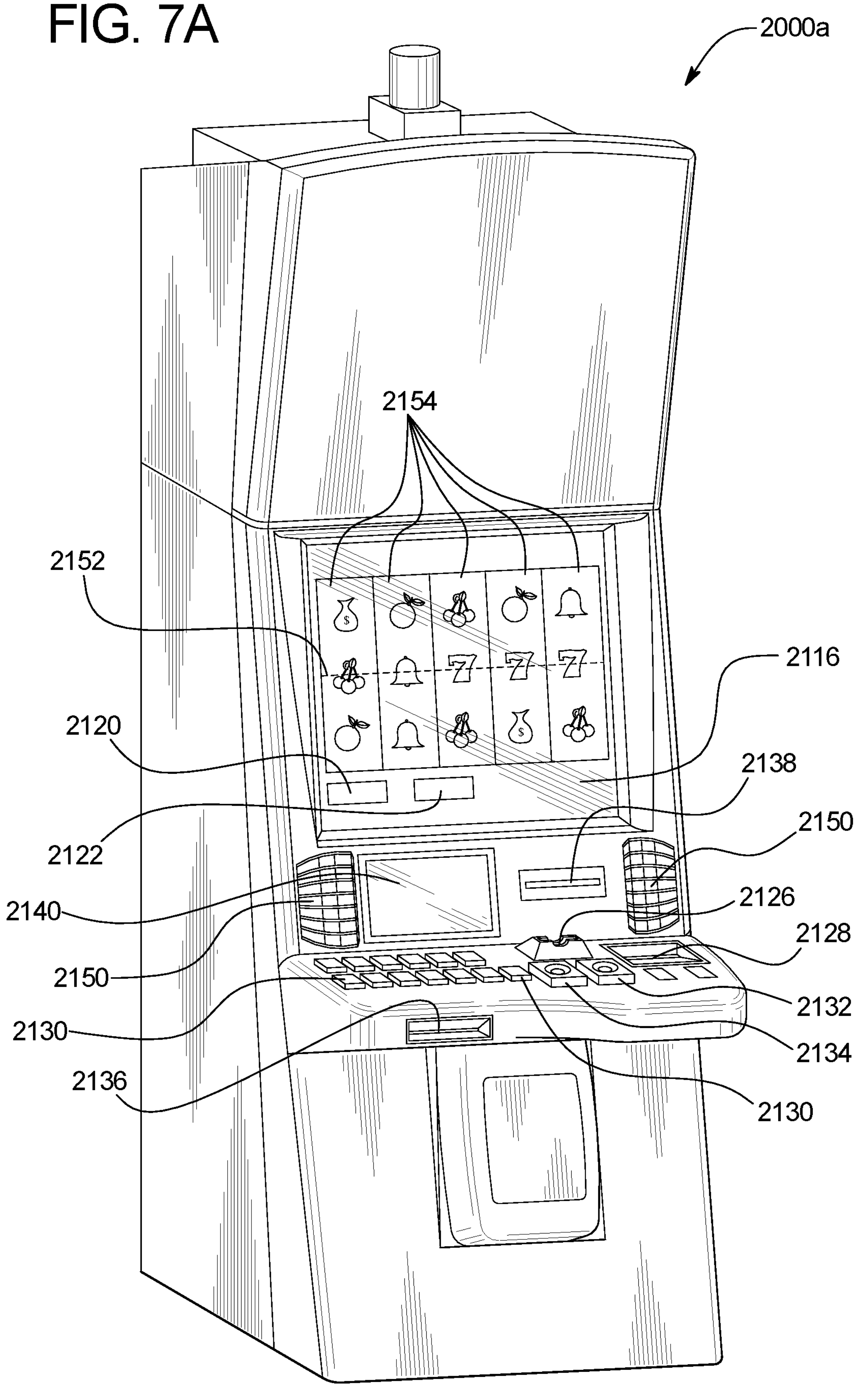
FIGS. 7A and 7B are perspective views of example alternative embodiments of the gaming system of the present disclosure.
Figure 7B:
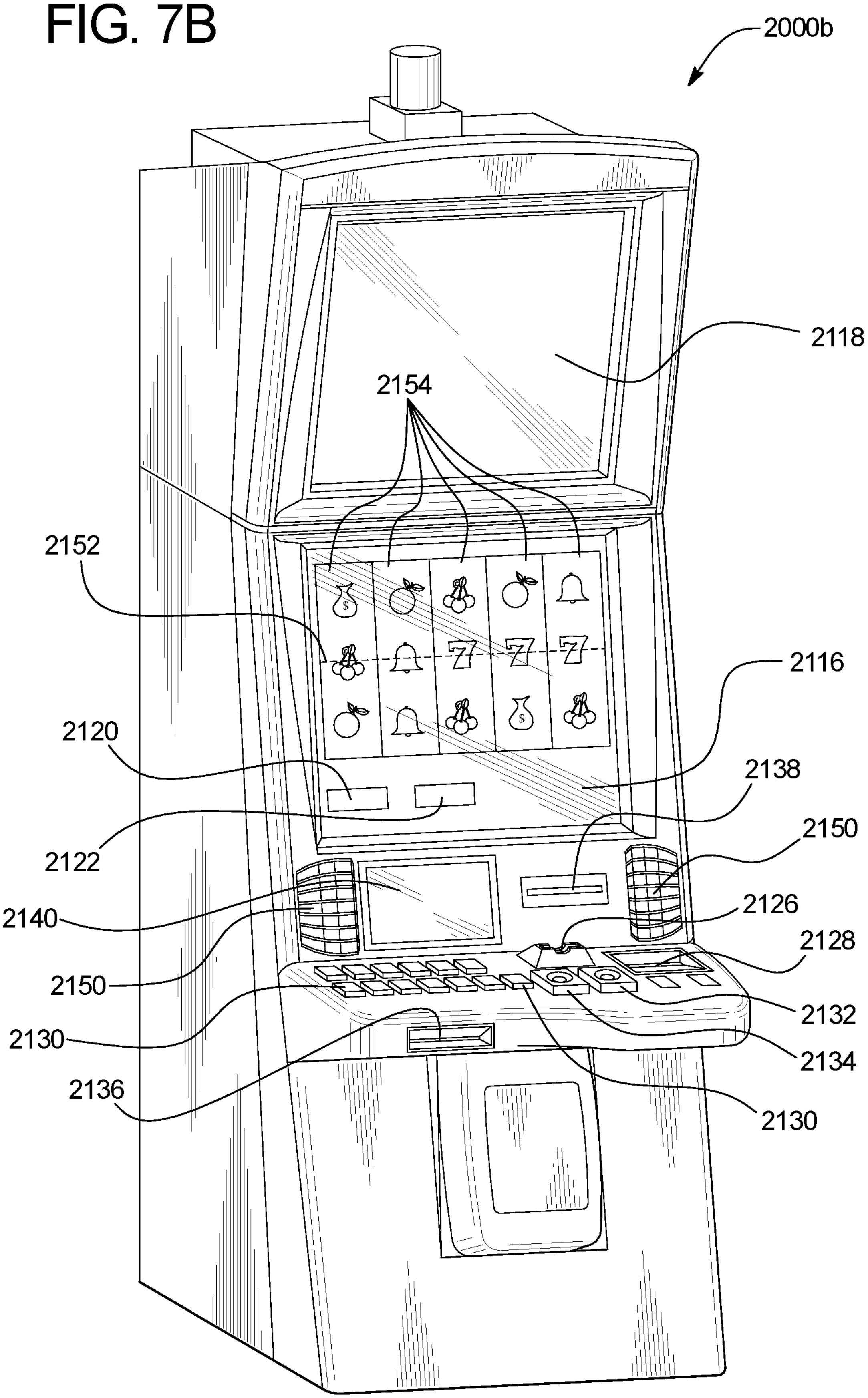
Figure 7C:
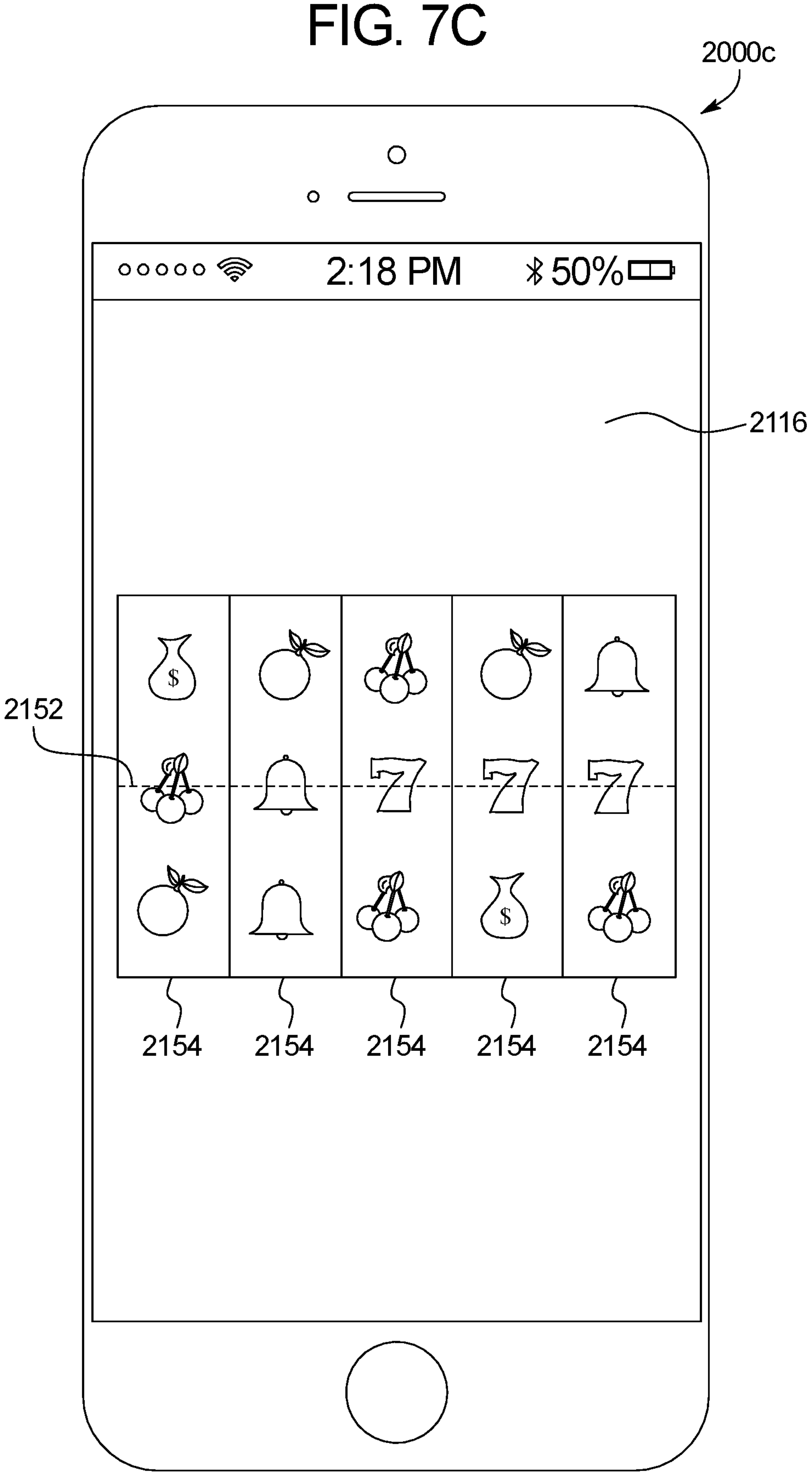
FIG. 7C is a front view of an example personal gaming device of the gaming system disclosed herein.

FIG. 6 is a block diagram of an example EGM 1000 and FIGS. 7A and 7B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 7C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™ near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets," which is incorporated herein by reference.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 7A includes a central display device 2116, a player tracking display 2140, a credit display 2120, and a bet display 2122. The example EGM 2000*b* illustrated in FIG. 7B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 7A and 7B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; U.S. Pat. No. 6,048,269, entitled "Coinless Slot Machine System and Method"; and U.S. Pat. No. 5,290,003, entitled "Gaming Machine and Coupons," which are incorporated herein by reference.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine," which is incorporated herein by reference.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 7A and 7B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 7A and 7B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine," which is incorporated herein by reference. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs **2000*a* and 2000*b* illustrated in FIGS. 7A and 7B each include a game play activation device in the form of a game play initiation button 2132**. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs **2000*a* and 2000*b* illustrated in FIGS. 7A and 7B each include a cashout device in the form of a cashout button 2134**.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs **2000*a* and 2000*b* illustrated in FIGS. 7A and 7B each include a plurality of such buttons 2130**.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs **2000*a* and 2000*b* illustrated in FIGS. 7A and 7B each include a card reader 2138**. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures.

For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 7A and 7B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 7A and 7B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game," which are incorporated herein by reference.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern," which are incorporated herein by reference.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services," which are incorporated herein by reference.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM 2000*b* shown in FIG. 7B includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations," which are incorporated herein by reference.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards," which are incorporated herein by reference As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win," which are incorporated herein by reference.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services," which are incorporated herein by reference.

Web-Based Gaming

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area. Examples of tethering an EGM to a personal gaming device and geo-fencing are described in U.S. Patent Appl. Pub. No. 2013/0267324, entitled "Remote Gaming Method Allowing Temporary Inactivation Without Terminating Playing Session Due to Game Inactivity," which is incorporated herein by reference.

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain Gaming Systems from General Purpose Computing Devices

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes," which are incorporated herein by reference.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to “re-trigger” the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player’s wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as “fault-tolerant” memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play," which are incorporated herein by reference.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification," which is incorporated herein by reference.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment," which is incorporated herein by reference.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System," which is incorporated herein by reference.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of operating an electronic gaming machine comprising a housing comprising an openable access door, a security monitoring circuit within the housing and configured to monitor the access door, a power distribution component within the housing, a plurality of mechanical input devices supported by the housing and comprising an acceptor configured to sense a physical item associated with a monetary value, a plurality of output devices comprising a display device supported by the housing and a speaker supported by the housing, a sound card within the housing and operable with the speaker, a processor within the housing, a trusted fault-tolerant memory device within the housing, said method comprising:

establishing a credit balance responsive to receipt, by the acceptor, of the physical item associated with a monetary value from the player;

enabling the player to place a wager on a wagering game via one of the plurality of mechanical input devices, the wager deductable from the credit balance;

determining a first display state of the electronic gaming machine by causing the display device to display a first play of the wagering game responsive to receipt of the wager and receipt of a game-initiation input via one of the plurality of mechanical input devices, the wagering game including a plurality of hands;

for a first hand of the plurality of hands of the first play of the wagering game:

determining a second display state of the electronic gaming machine by causing the display device to display a multiplier meter associated with the first hand, the multiplier meter comprising a current multiplier identifier and a multiplier queue simultaneously displayed with the current multiplier identifier and configured to indicate any multipliers associated with the first hand for any respective subsequent plays of the wagering game, wherein said multipliers are stored in the trusted fault-tolerant memory device and accessed by the processor for said display, determining if any multiplier bonus is associated with the first hand, in response to a determination that the multiplier bonus is associated with the first hand, awarding the multiplier bonus associated with the first hand, the multiplier bonus comprising a first multiplier associated with a corresponding first hand of a subsequent second play of the wagering game, and a second multiplier associated with a corresponding first hand of a subsequent third play of the wagering game, and when an opening of the access door is detected via the security monitoring circuit following the determination of the second display state of the electronic gaming machine:

disabling any occurrence of a multiplier meter modification event, storing data associated with the display state of the electronic gaming machine, the stored data comprising the displayed multiplier meter, and following at least a closing of the access door detected via the security monitoring circuit:

loading the stored data to reconstitute the second display state of the electronic gaming machine, and enabling an occurrence of the multiplier meter modification event; and determining a third display state of the electronic gaming machine by causing the display device to update the multiplier queue to simultaneously display the first multiplier and the second multiplier associated with the multiplier bonus of the first hand and the current multiplier identifier; and initiating a cashout of the credit balance responsive to receipt of a cashout input via one of the plurality of mechanical input devices.

2. The method of claim 1, which comprises determining a further display state of the electronic gaming machine by causing the display device to display the second play of the wagering game, and for the first hand of the second play of the wagering game: causing the display device to update the display of the multiplier meter to shift the first multiplier associated with the first hand of the second play of the wagering game from the multiplier queue to the current multiplier identifier, and determining any first award associated with the first hand based on cards of the first hand, a paytable, and the first multiplier in the current multiplier identifier.

3. The method of claim 2, which comprises determining a still further display state of the electronic gaming machine by causing the display device to display the third play of the wagering game, and for the first hand of the third play of the wagering game: causing the display device to update the display of the multiplier meter to shift the second multiplier associated with the first hand of the third play of the wagering game from the multiplier queue to the current multiplier identifier, and determining any second award associated with the first hand based on cards of the first hand, the paytable, and the second multiplier in the current multiplier identifier.

4. The method of claim 1, which comprises determining a further display state of the electronic gaming machine by, in response to the determination that the multiplier bonus is associated with the first hand: determining whether the multiplier queue includes a third multiplier; and in response to a determination that the multiplier queue includes the third multiplier, updating the third multiplier in the multiplier queue to a maximum multiplier value.

5. The method of claim 1, which comprises determining a further display state of the electronic gaming machine by, in response to the determination that the multiplier bonus is associated with the first hand: determining whether the multiplier queue includes a third multiplier; and in response to a determination that the multiplier queue includes the third multiplier, updating the first multiplier and the second multiplier to a maximum multiplier value.

6. The method of claim 1, which comprises determining a further display state of the electronic gaming machine by causing the display device to display the first multiplier and the second multiplier in the queue in ascending order.

7. The method of claim 1, which comprises determining a further display state of the electronic gaming machine by causing the display device to display the first multiplier and the second multiplier in the queue in descending order.

8. The method of claim 1, which comprises limiting a quantity of multipliers included in the multiplier queue to a maximum multiplier quantity.

9. The method of claim 8, wherein the maximum multiplier quantity is five multipliers.

10. The method of claim 1, wherein the first multiplier is different than the second multiplier.

11. A method of operating an electronic gaming machine comprising a housing comprising an openable access door, a security monitoring circuit within the housing and configured to monitor the access door, a power distribution component within the housing, a plurality of mechanical input devices supported by the housing and comprising an acceptor configured to sense a physical item associated with a monetary value, a plurality of output devices comprising a display device supported by the housing and a speaker supported by the housing, a sound card within the housing and operable with the speaker, a processor within the housing, a trusted fault-tolerant memory device within the housing, said method comprising:

establishing a credit balance responsive to receipt, by the acceptor, of the physical item associated with a monetary value from the player;

enabling the player to place a wager on a wagering game via one of the plurality of mechanical input devices, the wager deductable from the credit balance;

initiating a first play of the wagering game responsive to receipt of the wager and receipt of a game-initiation input via one of the plurality of mechanical input devices;

randomly determining a plurality of cards from a first set of cards to form an initial first hand of cards;

determining a first display state of the electronic gaming machine by causing the display device to display the first hand of cards;

determining a second display state of the electronic gaming machine by causing the display device to display a multiplier meter associated with the first hand of cards, the multiplier meter comprising a current multiplier identifier and a multiplier queue simultaneously displayed with the current multiplier identifier and displaying any multipliers associated with the first hand of cards for any respective subsequent plays of the wagering game;

when an opening of the access door is detected via the security monitoring circuit following the determination of the second display state of the electronic gaming machine:

disabling any occurrence of a multiplier meter modification event, storing data associated with the second display state of the electronic gaming machine, the stored data comprising the displayed multiplier meter, and following at least a closing of the access door detected via the security monitoring circuit:

loading the stored data to reconstitute the second display state of the electronic gaming machine, and enabling an occurrence of the multiplier meter modification event;

determining a third display state of the electronic gaming machine by causing the display device to display an indication of a second hand of cards;

causing via one of the plurality of mechanical input devices, for each card in the first hand of cards, a hold input for a selected card;

in response to detecting the hold input for a card in the first hand via one of the plurality of mechanical input devices:

designating the card as a held-card of the first hand of cards;

duplicating the card in the second hand of cards; and determining a fourth display state of the electronic gaming machine by causing the display device to display the duplicated card in the second hand of cards;

designating each card for which the hold input is not received in the first hand of cards as a non-held card;

in response to detecting a draw input, for each non-held card in the first hand of cards: randomly determining a replacement card from the first set of cards; replacing the non-held card with the replacement card;

determining a fifth display state of the electronic gaming machine by causing the display device to display the replacement card in the first hand of cards;

randomly determining an additional card from a second set of cards associated with the second hand of cards;

adding the additional card to the second set of cards; and determining a sixth display state of the electronic gaming machine by causing the display device to display the additional card in the second hand of cards;

determining a first award based on the first hand of cards, a paytable, and any first multiplier bonus associated with the first hand of cards;

determining a second award to be associated with a second play of the wagering game, the second award based on: the first hand of cards, and a multiplier bonus award paytable, the second award including a second multiplier bonus based on the first hand of cards;

awarding the second multiplier bonus associated with the first hand of cards;

determining a seventh display state of the electronic gaming machine by causing the display device to update the multiplier queue to display the second multiplier bonus;

causing a change to the multiplier stored in the trusted fault-tolerant memory device in association with the multiplier queue;

causing the credit balance to increase based on any determined first award and any determined second award; and initiating a cashout of the credit balance responsive to receipt of a cashout input via one of the plurality of mechanical input devices.

12. The method of claim 11, which comprises determining a further display state of the electronic gaming machine by, during the second play of the wagering game, determining a third award based on a third hand of cards, the paytable, and the second multiplier bonus, the second play of the wagering game occurring after the first play of the wagering game.

13. The method of claim 11, which comprises determining a further display state of the electronic gaming machine by, in response to initiating the second play of the wagering game, updating the display of the multiplier meter by: identifying the second multiplier bonus as a current multiplier bonus; and shifting the second multiplier bonus from the multiplier queue to the current multiplier identifier.

14. The method of claim 11, which comprises determining a further display state of the electronic gaming machine by adding the second multiplier bonus to the multiplier queue by: determining whether the multiplier queue includes a third multiplier bonus; and in response to a determination that the multiplier queue does include the third multiplier bonus: updating the third multiplier bonus to a maximum multiplier bonus; and causing the display device to display the updated third multiplier bonus in the multiplier queue.

15. The method of claim 11, which comprises determining a further display state of the electronic gaming machine by adding the second multiplier bonus to the multiplier queue by: determining whether the multiplier queue includes a third multiplier bonus; and in response to a determination that the multiplier queue does include the third multiplier bonus, causing the display device to display the second multiplier bonus after the third multiplier bonus in the multiplier queue.

16. The method of claim 15, which comprises determining a still further display state of the electronic gaming machine by causing the display device to display the second multiplier bonus and the third multiplier bonus in the multiplier queue.

17. A method of operating an electronic gaming machine comprising a housing comprising an openable access door, a security monitoring circuit within the housing and configured to monitor the access door, a power distribution component within the housing, a plurality of mechanical input devices supported by the housing and comprising an acceptor configured to sense a physical item associated with a monetary value, a plurality of output devices comprising a display device supported by the housing and a speaker supported by the housing, a sound card within the housing and operable with the speaker, a processor within the housing, a trusted memory device within the housing, said method comprising:

establishing a credit balance responsive to receipt, by the acceptor, of the physical item associated with a monetary value from the player;

enabling the player to place a wager on a wagering game via one of the plurality of mechanical input devices, the wager deductable from the credit balance;

for a first play of the wagering game, determining a first display state of the electronic gaming machine by communicating data that results in a display, by a display device, of a first multiplier meter associated with a first part of the wagering game, the first multiplier meter comprising a first current multiplier associated with the first part of the wagering game for the first play of the game, a first queued multiplier associated with the first part of the wagering game for a second play of the wagering game, and a second queued multiplier associated with the first part of the wagering game for a third play of the wagering game, wherein said first current multiplier, the first queued multiplier, and the second queued multiplier are stored in the trusted fault-tolerant memory device and accessed by the processor for said display;

when an opening of the access door is detected via the security monitoring circuit following the determination of the first display state of the electronic gaming machine:

disabling any occurrence of a first multiplier meter modification event, storing data associated with the first display state of the electronic gaming machine, the stored data comprising the displayed first multiplier meter, and following at least a closing of the access door detected via the security monitoring circuit:

loading the stored data to reconstitute the first display state of the electronic gaming machine, and enabling an occurrence of the multiplier meter modification event;

responsive to receipt of a first wager and a first game-initiation input from the player for the first play of the wagering game via one of the plurality of mechanical input devices:

deducting the first wager from the credit balance, determining a second display state of the electronic gaming machine by communicating data that results in a display, by the display device, of the first play of the wagering game, determining a first award for the first play of the wagering game based on an outcome associated with the first part of the wagering game for the first play of the wagering game and the first current multiplier associated with the first part of the wagering game, and determining a third display state of the electronic gaming machine by communicating data that results in a display, by the display device, of the first award for the first play of the wagering game;

responsive to receipt of a second wager and a second game-initiation input from the player for the second play of the wagering game via one of the plurality of mechanical input devices:

deducting the second wager from the credit balance, determining a fourth display state of the electronic gaming machine by communicating data that results in a display, by the display device, of the second play of the wagering game, determining a second award for the second play of the wagering game based on an outcome associated with the first part of the wagering game for the second play of the wagering game and the first queued multiplier associated with the first part of the wagering game, and determining a fifth display state of the electronic gaming machine by communicating data that results in a display, by the display device, of the second award for the second play of the wagering game;

responsive to receipt of a third wager and a third game-initiation input from the player for a third play of the wagering game via one of the plurality of mechanical input devices:

deducting the third wager from the credit balance, determining a sixth display state of the electronic gaming machine by communicating data that results in a display, by the display device, of the third play of the wagering game, determining a third award for the third play of the wagering game based on an outcome associated with the first part of the wagering game for the third play of the wagering game and the second queued multiplier, and determining a seventh display state of the electronic gaming machine by communicating data that results in a display, by the display device, of the third award for the third play of the wagering game;

causing the credit balance to increase based on the first award, the second award, and the third award; and initiating a cashout of the credit balance responsive to receipt of a cashout input via one of the plurality of mechanical input devices.

18. The method of claim 17, which comprises determining a further display state of the electronic gaming machine by, after the display of the first play of the wagering game, and before the display of the second play of the wagering game, communicating data that results in a display, by the display device, of an update of the multiplier meter wherein the first queued multiplier shifts position.

19. The method of claim 17, wherein the first part of the wagering game is one of a plurality of hands of the wagering game.

20. The method of claim 17, which comprises determining a further display state of the electronic gaming machine by, responsive to a determination that a multiplier bonus is associated with the first part of the wagering game and that a quantity of multipliers in the multiplier meter is a maximum multiplier quantity, increasing one of the multipliers in the multiplier meter.

* * * * *